(12) United States Patent
Wrobel

(10) Patent No.: US 11,187,285 B2
(45) Date of Patent: Nov. 30, 2021

(54) SYSTEMS AND METHODS FOR SELECTIVELY ROTATIONALLY FIXING A PEDALED DRIVETRAIN

(71) Applicant: ICON Health & Fitness, Inc., Logan, UT (US)

(72) Inventor: David Wrobel, Farr West, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 2 days.

(21) Appl. No.: 16/210,963

(22) Filed: Dec. 5, 2018

(65) Prior Publication Data

US 2019/0178313 A1 Jun. 13, 2019

Related U.S. Application Data

(60) Provisional application No. 62/596,815, filed on Dec. 9, 2017, provisional application No. 62/609,718, filed on Dec. 22, 2017.

(51) Int. Cl.
*F16D 41/26* (2006.01)
*F16D 48/06* (2006.01)
(Continued)

(52) U.S. Cl.
CPC ............. *F16D 41/26* (2013.01); *F16D 41/30* (2013.01); *F16D 48/06* (2013.01); *B60B 27/047* (2013.01);
(Continued)

(58) Field of Classification Search
CPC .. F16H 41/24; F16H 41/066; F16H 2041/246; F16H 41/26; F16H 41/30;
(Continued)

(56) References Cited

U.S. PATENT DOCUMENTS 3,123,646 A 3/1964 Easton
3,579,339 A 5/1971 Chang
(Continued)

FOREIGN PATENT DOCUMENTS

CN 203609796 5/2014
CN 103363001 10/2015
(Continued)

OTHER PUBLICATIONS

International Search Report and Written Opinion issued in PCT/US2018/064582 dated Mar. 27, 2019.
(Continued)

*Primary Examiner* — Stacey A Fluhart
(74) *Attorney, Agent, or Firm* — Ray Quinney & Nebeker P.C.; Paul N. Taylor

(57) ABSTRACT

A pedaled drivetrain includes a drive mechanism, a wheel, a freewheel hub, and a locking mechanism. The wheel has a rotational axis. The freewheel hub connects the drive mechanism to the wheel, and the freewheel hub transmits torque from the drive mechanism to the wheel in a first rotational direction around the rotational axis. The locking mechanism has a locked state and an unlocked state. The locked state rotationally fixes a component of the drive mechanism to the wheel relative to the rotational axis.

19 Claims, 16 Drawing Sheets

(51) Int. Cl.
*F16D 41/30* (2006.01)
*B60B 27/04* (2006.01)

(52) U.S. Cl.
CPC .............. *F16D 2300/24* (2013.01); *F16D 2500/10406* (2013.01)

(58) Field of Classification Search
CPC ........ F16H 41/04; F16H 25/061; F16H 11/14; F16H 2011/006; F16H 2023/123; B60B 27/047
See application file for complete search history.

(56) References Cited

U.S. PATENT DOCUMENTS

| | | |
|---|---|---|
| 4,023,795 A | 5/1977 | Pauls |
| 4,300,760 A | 11/1981 | Bobroff |
| D286,311 S | 10/1986 | Martinell |
| 4,630,839 A | 12/1986 | Seol |
| 4,681,318 A | 7/1987 | Lay |
| 4,684,126 A | 8/1987 | Dalebout |
| 4,728,102 A | 3/1988 | Pauls |
| 4,750,736 A | 6/1988 | Watterson |
| 4,796,881 A | 1/1989 | Watterson |
| 4,813,667 A | 3/1989 | Watterson |
| 4,830,371 A | 5/1989 | Lay |
| 4,844,451 A | 7/1989 | Bersonnet |
| 4,850,585 A | 7/1989 | Dalebout |
| D304,849 S | 11/1989 | Watterson |
| 4,880,225 A | 11/1989 | Lucas |
| 4,883,272 A | 11/1989 | Lay |
| D306,468 S | 3/1990 | Watterson |
| D306,891 S | 3/1990 | Watterson |
| 4,913,396 A | 4/1990 | Dalebout |
| D307,614 S | 5/1990 | Bingham |
| D307,615 S | 5/1990 | Bingham |
| 4,921,242 A | 5/1990 | Watterson |
| 4,932,650 A | 6/1990 | Bingham |
| D309,167 S | 7/1990 | Griffin |
| D309,485 S | 7/1990 | Bingham |
| 4,938,478 A | 7/1990 | Lay |
| D310,253 S | 8/1990 | Bersonnet |
| 4,955,599 A | 9/1990 | Bersonnet |
| 4,971,316 A | 11/1990 | Dalebout |
| D313,055 S | 12/1990 | Watterson |
| 4,974,832 A | 12/1990 | Dalebout |
| 4,979,737 A | 12/1990 | Kock |
| 4,981,294 A | 1/1991 | Dalebout |
| D315,765 S | 3/1991 | Measom |
| 4,998,725 A | 3/1991 | Watterson |
| 5,000,442 A | 3/1991 | Dalebout |
| 5,000,443 A | 3/1991 | Dalebout |
| 5,000,444 A | 3/1991 | Dalebout |
| D316,124 S | 4/1991 | Dalebout |
| 5,013,033 A | 5/1991 | Watterson |
| 5,014,980 A | 5/1991 | Bersonnet |
| 5,016,871 A | 5/1991 | Dalebout |
| D318,085 S | 7/1991 | Jacobson |
| D318,086 S | 7/1991 | Bingham |
| D318,699 S | 7/1991 | Jacobson |
| 5,029,801 A | 7/1991 | Dalebout |
| 5,033,736 A | 7/1991 | Hirschfeld |
| 5,034,576 A | 7/1991 | Dalebout |
| 5,058,881 A | 10/1991 | Measom |
| 5,058,882 A | 10/1991 | Dalebout |
| D321,388 S | 11/1991 | Dalebout |
| 5,062,626 A | 11/1991 | Dalebout |
| 5,062,627 A | 11/1991 | Bingham |
| 5,062,632 A | 11/1991 | Dalebout |
| 5,062,633 A | 11/1991 | Engel et al. |
| 5,067,710 A | 11/1991 | Watterson |
| 5,072,929 A | 12/1991 | Peterson |
| D323,009 S | 1/1992 | Dalebout |
| D323,198 S | 1/1992 | Dalebout |
| D323,199 S | 1/1992 | Dalebout |
| D323,863 S | 2/1992 | Watterson |
| 5,085,305 A * | 2/1992 | Cheng ................ F16D 11/14 192/69.82 |
| 5,088,729 A | 2/1992 | Dalebout |
| 5,090,694 A | 2/1992 | Pauls |
| 5,102,380 A | 4/1992 | Jacobson |
| 5,104,120 A | 4/1992 | Watterson |
| 5,108,093 A | 4/1992 | Watterson |
| D326,491 S | 5/1992 | Dalebout |
| 5,122,105 A | 6/1992 | Engel |
| 5,135,216 A | 8/1992 | Bingham |
| 5,147,265 A | 9/1992 | Pauls |
| 5,149,084 A | 9/1992 | Dalebout |
| 5,149,312 A | 9/1992 | Croft et al. |
| 5,171,196 A | 12/1992 | Lynch |
| D332,347 S | 1/1993 | Raadt |
| 5,190,505 A | 3/1993 | Dalebout |
| 5,192,255 A | 3/1993 | Dalebout |
| 5,195,937 A | 3/1993 | Engel |
| 5,203,826 A | 4/1993 | Dalebout |
| D335,511 S | 5/1993 | Engel |
| D335,905 S | 5/1993 | Cutter |
| D336,498 S | 6/1993 | Engel |
| 5,217,487 A | 6/1993 | Engel |
| D337,361 S | 7/1993 | Engel |
| D337,666 S | 7/1993 | Peterson |
| D337,799 S | 7/1993 | Cutter |
| 5,226,866 A | 7/1993 | Engel |
| 5,244,446 A | 9/1993 | Engel |
| 5,247,853 A | 9/1993 | Dalebout |
| 5,259,611 A | 11/1993 | Dalebout |
| D342,106 S | 12/1993 | Campbell |
| 5,279,528 A | 1/1994 | Dalebout |
| D344,112 S | 2/1994 | Smith |
| D344,557 S | 2/1994 | Ashby |
| 5,282,776 A | 2/1994 | Dalebout |
| 5,295,931 A | 3/1994 | Dreibelbis |
| 5,302,161 A | 4/1994 | Loubert |
| D347,251 S | 5/1994 | Dreibelbis |
| 5,316,534 A | 5/1994 | Dalebout |
| D348,493 S | 7/1994 | Ashby |
| D348,494 S | 7/1994 | Ashby |
| 5,328,164 A | 7/1994 | Soga |
| D349,931 S | 8/1994 | Bostic |
| 5,336,142 A | 8/1994 | Dalebout |
| 5,344,376 A | 9/1994 | Bostic |
| D351,202 S | 10/1994 | Bingham |
| D351,435 S | 10/1994 | Peterson |
| D351,633 S | 10/1994 | Bingham |
| D352,534 S | 11/1994 | Dreibelbis |
| D353,422 S | 12/1994 | Bostic |
| 5,372,559 A | 12/1994 | Dalebout |
| 5,374,228 A | 12/1994 | Buisman |
| 5,382,221 A | 1/1995 | Hsu |
| 5,387,168 A | 2/1995 | Bostic |
| 5,393,690 A | 2/1995 | Fu |
| D356,128 S | 3/1995 | Smith |
| 5,409,435 A | 4/1995 | Daniels |
| 5,429,563 A | 7/1995 | Engel |
| 5,431,612 A | 7/1995 | Holden |
| D360,915 S | 8/1995 | Bostic |
| 5,468,205 A | 11/1995 | McFall |
| 5,489,249 A | 2/1996 | Brewer |
| 5,492,517 A | 2/1996 | Bostic |
| D367,689 S | 3/1996 | Wilkinson |
| 5,511,740 A | 4/1996 | Loubert |
| 5,512,025 A | 4/1996 | Dalebout |
| D370,949 S | 6/1996 | Furner |
| D371,176 S | 6/1996 | Furner |
| 5,527,245 A | 6/1996 | Dalebout |
| 5,529,553 A | 6/1996 | Finlayson |
| 5,540,429 A | 7/1996 | Dalebout |
| 5,549,533 A | 8/1996 | Olson |
| 5,554,085 A | 9/1996 | Dalebout |
| 5,569,128 A | 10/1996 | Dalebout |
| 5,591,105 A | 1/1997 | Dalebout |
| 5,591,106 A | 1/1997 | Dalebout |
| 5,595,556 A | 1/1997 | Dalebout |
| 5,607,375 A | 3/1997 | Dalebout |

(56) References Cited

U.S. PATENT DOCUMENTS

| | | |
|---|---|---|
| 5,611,539 A | 3/1997 | Watterson |
| 5,622,527 A | 4/1997 | Watterson |
| 5,626,538 A | 5/1997 | Dalebout |
| 5,626,542 A | 5/1997 | Dalebout |
| D380,024 S | 6/1997 | Novak |
| 5,637,059 A | 6/1997 | Dalebout |
| D380,509 S | 7/1997 | Wilkinson |
| 5,643,153 A | 7/1997 | Nylen |
| 5,645,509 A | 7/1997 | Brewer |
| D384,118 S | 9/1997 | Deblauw |
| 5,662,557 A | 9/1997 | Watterson |
| 5,669,857 A | 9/1997 | Watterson |
| 5,672,140 A | 9/1997 | Watterson |
| 5,674,156 A | 10/1997 | Watterson |
| 5,674,453 A | 10/1997 | Watterson |
| 5,676,624 A | 10/1997 | Watterson |
| 5,683,331 A | 11/1997 | Dalebout |
| 5,683,332 A | 11/1997 | Watterson |
| D387,825 S | 12/1997 | Fleck |
| 5,695,433 A | 12/1997 | Buisman |
| 5,695,434 A | 12/1997 | Dalebout |
| 5,695,435 A | 12/1997 | Dalebout et al. |
| 5,702,325 A | 12/1997 | Watterson |
| 5,704,879 A | 1/1998 | Watterson |
| 5,718,657 A | 2/1998 | Dalebout et al. |
| 5,720,200 A | 2/1998 | Anderson |
| 5,720,698 A | 2/1998 | Dalebout |
| D392,006 S | 3/1998 | Dalebout |
| 5,722,922 A | 3/1998 | Watterson |
| 5,733,229 A | 3/1998 | Dalebout |
| 5,743,833 A | 4/1998 | Watterson |
| 5,762,584 A | 6/1998 | Daniels |
| 5,762,587 A | 6/1998 | Dalebout |
| 5,772,560 A | 6/1998 | Watterson |
| 5,810,698 A | 9/1998 | Hullett |
| 5,827,155 A | 10/1998 | Jensen |
| 5,830,114 A | 11/1998 | Halfen |
| 5,860,893 A | 1/1999 | Watterson |
| 5,860,894 A | 1/1999 | Dalebout |
| 5,899,834 A | 5/1999 | Dalebout |
| D412,953 S | 8/1999 | Armstrong |
| D413,948 S | 9/1999 | Dalebout |
| 5,951,441 A | 9/1999 | Dalebout |
| 5,951,448 A | 9/1999 | Bolland |
| 5,961,424 A | 10/1999 | Warner et al. |
| D416,596 S | 11/1999 | Armstrong |
| 6,003,166 A | 12/1999 | Hald |
| 6,019,710 A | 2/2000 | Dalebout |
| 6,027,429 A | 2/2000 | Daniels |
| 6,033,347 A | 3/2000 | Dalebout et al. |
| D425,940 S | 5/2000 | Halfen |
| 6,059,692 A | 5/2000 | Hickman |
| D428,949 S | 8/2000 | Simonson |
| 6,123,646 A | 9/2000 | Colassi |
| 6,171,217 B1 | 1/2001 | Cutler |
| 6,171,219 B1 | 1/2001 | Simonson |
| 6,174,267 B1 | 1/2001 | Dalebout |
| 6,193,631 B1 | 2/2001 | Hickman |
| 6,228,003 B1 | 5/2001 | Hald |
| 6,238,323 B1 | 5/2001 | Simonson |
| 6,251,052 B1 | 6/2001 | Simonson |
| 6,261,022 B1 | 7/2001 | Dalebout et al. |
| 6,280,362 B1 | 8/2001 | Dalebout et al. |
| 6,296,594 B1 | 10/2001 | Simonson |
| D450,872 S | 11/2001 | Dalebout |
| 6,312,363 B1 | 11/2001 | Watterson |
| D452,338 S | 12/2001 | Dalebout |
| D453,543 S | 2/2002 | Cutler |
| D453,948 S | 2/2002 | Cutler |
| 6,350,218 B1 | 2/2002 | Dalebout et al. |
| 6,387,020 B1 | 5/2002 | Simonson |
| 6,413,191 B1 | 7/2002 | Harris |
| 6,422,980 B1 | 7/2002 | Simonson |
| 6,447,424 B1 | 9/2002 | Ashby et al. |
| 6,458,060 B1 | 10/2002 | Watterson |
| 6,458,061 B2 | 10/2002 | Simonson |
| 6,471,622 B1 | 10/2002 | Hammer |
| 6,563,225 B2 | 5/2003 | Soga |
| 6,601,016 B1 | 7/2003 | Brown |
| 6,623,140 B2 | 9/2003 | Watterson |
| 6,626,799 B2 | 9/2003 | Watterson |
| 6,648,802 B2 | 11/2003 | Ware |
| 6,652,424 B2 | 11/2003 | Dalebout |
| 6,685,607 B1 | 2/2004 | Olson |
| 6,695,581 B2 | 2/2004 | Wasson |
| 6,701,271 B2 | 3/2004 | Willner |
| 6,702,719 B1 | 3/2004 | Brown |
| 6,712,740 B2 | 3/2004 | Simonson |
| 6,730,002 B2 | 5/2004 | Hald |
| 6,743,153 B2 | 6/2004 | Watterson |
| 6,746,371 B1 | 6/2004 | Brown |
| 6,749,537 B1 | 6/2004 | Hickman |
| 6,752,453 B1 | 6/2004 | Yapp |
| 6,761,667 B1 | 7/2004 | Cutler et al. |
| 6,770,015 B2 | 8/2004 | Simonson |
| 6,786,852 B2 | 9/2004 | Watterson |
| 6,808,472 B1 | 10/2004 | Hickman |
| 6,821,230 B2 | 11/2004 | Dalebout |
| 6,830,540 B2 | 12/2004 | Watterson |
| 6,863,641 B1 | 3/2005 | Brown |
| 6,866,613 B1 | 3/2005 | Brown |
| 6,875,160 B2 | 4/2005 | Watterson |
| D507,311 S | 7/2005 | Butler |
| 6,918,858 B2 | 7/2005 | Watterson |
| 6,921,351 B1 | 7/2005 | Hickman |
| 6,974,404 B1 | 12/2005 | Watterson |
| 6,997,852 B2 | 2/2006 | Watterson |
| 7,025,713 B2 | 4/2006 | Dalebout |
| D520,085 S | 5/2006 | Willardson |
| 7,044,897 B2 | 5/2006 | Myers |
| 7,052,442 B2 | 5/2006 | Watterson |
| 7,060,006 B1 | 6/2006 | Watterson |
| 7,060,008 B2 | 6/2006 | Watterson et al. |
| 7,070,539 B2 | 7/2006 | Brown |
| 7,097,588 B2 | 8/2006 | Watterson |
| D527,776 S | 9/2006 | Willardson |
| 7,112,168 B2 | 9/2006 | Dalebout et al. |
| 7,128,693 B2 | 10/2006 | Brown |
| 7,166,062 B1 | 1/2007 | Watterson |
| 7,166,064 B2 | 1/2007 | Watterson |
| 7,169,087 B2 | 1/2007 | Ercanbrack |
| 7,169,093 B2 | 1/2007 | Simonson |
| 7,192,388 B2 | 3/2007 | Dalebout |
| 7,250,022 B2 | 7/2007 | Dalebout |
| 7,282,016 B2 | 10/2007 | Simonson |
| 7,285,075 B2 | 10/2007 | Cutler |
| 7,344,481 B2 | 3/2008 | Watterson |
| 7,377,882 B2 | 5/2008 | Watterson |
| 7,425,188 B2 | 9/2008 | Ercanbrack |
| 7,429,236 B2 | 9/2008 | Dalebout |
| 7,455,622 B2 | 11/2008 | Watterson |
| 7,482,050 B2 | 1/2009 | Olson |
| D588,655 S | 3/2009 | Utykanski |
| 7,510,509 B2 | 3/2009 | Hickman |
| 7,537,546 B2 | 5/2009 | Watterson |
| 7,537,549 B2 | 5/2009 | Nelson |
| 7,537,552 B2 | 5/2009 | Dalebout |
| 7,540,828 B2 | 6/2009 | Watterson |
| 7,549,947 B2 | 6/2009 | Hickman |
| 7,556,590 B2 | 7/2009 | Watterson et al. |
| 7,563,203 B2 | 7/2009 | Dalebout |
| 7,575,536 B1 | 8/2009 | Hickman |
| 7,601,105 B1 | 10/2009 | Gipson, III |
| 7,604,573 B2 | 10/2009 | Dalebout |
| D604,373 S | 11/2009 | Dalebout |
| 7,618,350 B2 | 11/2009 | Dalebout |
| 7,618,357 B2 | 11/2009 | Dalebout |
| 7,625,315 B2 | 12/2009 | Hickman |
| 7,625,321 B2 | 12/2009 | Simonson |
| 7,628,730 B1 | 12/2009 | Watterson |
| 7,628,737 B2 | 12/2009 | Kowallis |
| 7,637,847 B1 | 12/2009 | Hickman |
| 7,645,212 B2 | 1/2010 | Ashby et al. |
| 7,645,213 B2 | 1/2010 | Watterson |

(56) References Cited

U.S. PATENT DOCUMENTS

| | | |
|---|---|---|
| 7,658,698 B2 | 2/2010 | Pacheco |
| 7,674,205 B2 | 3/2010 | Dalebout |
| 7,713,171 B1 | 5/2010 | Hickman |
| 7,713,172 B2 | 5/2010 | Watterson |
| 7,713,180 B2 | 5/2010 | Wickens |
| 7,717,828 B2 | 5/2010 | Simonson |
| 7,736,279 B2 | 6/2010 | Dalebout |
| 7,740,563 B2 | 6/2010 | Dalebout |
| 7,749,144 B2 | 7/2010 | Hammer |
| 7,766,797 B2 | 8/2010 | Dalebout |
| 7,771,329 B2 | 8/2010 | Dalebout |
| 7,775,940 B2 | 8/2010 | Dalebout |
| 7,789,800 B1 | 9/2010 | Watterson |
| 7,798,946 B2 | 9/2010 | Dalebout |
| 7,815,550 B2 | 10/2010 | Watterson |
| 7,857,731 B2 | 12/2010 | Hickman |
| 7,862,475 B2 | 1/2011 | Watterson |
| 7,862,478 B2 | 1/2011 | Watterson |
| 7,862,483 B2 | 1/2011 | Hendrickson |
| 7,874,615 B2 | 1/2011 | Huyck |
| D635,207 S | 3/2011 | Dalebout |
| 7,901,330 B2 | 3/2011 | Dalebout |
| 7,909,740 B2 | 3/2011 | Dalebout |
| 7,963,889 B2 | 6/2011 | Badarneh |
| 7,980,996 B2 | 7/2011 | Hickman |
| 7,981,000 B2 | 7/2011 | Watterson |
| 7,985,164 B2 | 7/2011 | Ashby |
| 8,029,415 B2 | 10/2011 | Ashby et al. |
| 8,033,960 B1 | 10/2011 | Dalebout |
| D650,451 S | 12/2011 | Olson |
| D652,877 S | 1/2012 | Dalebout |
| 8,152,702 B2 | 4/2012 | Pacheco |
| D659,775 S | 5/2012 | Olson |
| D659,777 S | 5/2012 | Watterson |
| D660,383 S | 5/2012 | Watterson |
| D664,613 S | 7/2012 | Dalebout |
| 8,251,874 B2 | 8/2012 | Ashby |
| 8,298,123 B2 | 10/2012 | Hickman |
| 8,298,125 B2 | 10/2012 | Colledge |
| D671,177 S | 11/2012 | Sip |
| D671,178 S | 11/2012 | Sip |
| D673,626 S | 1/2013 | Olson |
| 8,690,735 B2 | 4/2014 | Watterson |
| D707,763 S | 6/2014 | Cutler |
| 8,740,753 B2 | 6/2014 | Olson |
| 8,758,201 B2 | 6/2014 | Ashby |
| 8,771,153 B2 | 7/2014 | Dalebout |
| 8,784,270 B2 | 7/2014 | Watterson |
| 8,808,148 B2 | 8/2014 | Watterson |
| 8,814,762 B2 | 8/2014 | Butler |
| D712,493 S | 9/2014 | Ercanbrack |
| 8,827,871 B2 | 9/2014 | Golesh |
| 8,840,075 B2 | 9/2014 | Olson |
| 8,845,493 B2 | 9/2014 | Watterson et al. |
| 8,870,726 B2 | 10/2014 | Watterson |
| 8,876,668 B2 | 11/2014 | Hendrickson |
| 8,876,669 B2 | 11/2014 | Vujicic |
| 8,894,549 B2 | 11/2014 | Colledge |
| 8,894,555 B2 | 11/2014 | Olson |
| 8,911,330 B2 | 12/2014 | Watterson |
| 8,920,288 B2 | 12/2014 | Dalebout |
| 8,986,165 B2 | 3/2015 | Ashby |
| 8,992,364 B2 | 3/2015 | Law |
| 8,992,387 B2 | 3/2015 | Watterson |
| D726,476 S | 4/2015 | Ercanbrack |
| 9,028,368 B2 | 5/2015 | Ashby |
| 9,028,370 B2 | 5/2015 | Watterson |
| 9,039,578 B2 | 5/2015 | Dalebout |
| D731,011 S | 6/2015 | Buchanan |
| 9,072,930 B2 | 7/2015 | Ashby |
| 9,119,983 B2 | 9/2015 | Rhea |
| 9,123,317 B2 | 9/2015 | Watterson |
| 9,126,071 B2 | 9/2015 | Smith |
| 9,126,072 B2 | 9/2015 | Watterson |
| 9,138,615 B2 | 9/2015 | Olson |
| 9,142,139 B2 | 9/2015 | Watterson |
| 9,144,703 B2 | 9/2015 | Dalebout |
| 9,149,683 B2 | 9/2015 | Smith |
| 9,186,535 B2 | 11/2015 | Ercanbrack |
| 9,186,549 B2 | 11/2015 | Watterson |
| 9,254,409 B2 | 2/2016 | Dalebout |
| 9,254,416 B2 | 2/2016 | Ashby |
| 9,278,248 B2 | 3/2016 | Tyger |
| 9,278,249 B2 | 3/2016 | Watterson |
| 9,278,250 B2 | 3/2016 | Buchanan |
| 9,289,648 B2 | 3/2016 | Watterson |
| 9,339,691 B2 | 5/2016 | Brammer |
| 9,352,185 B2 | 5/2016 | Hendrickson |
| 9,352,186 B2 | 5/2016 | Watterson |
| 9,375,605 B2 | 6/2016 | Tyger |
| 9,381,394 B2 | 7/2016 | Mortensen |
| 9,387,387 B2 | 7/2016 | Dalebout |
| 9,393,453 B2 | 7/2016 | Watterson |
| 9,403,047 B2 | 8/2016 | Olson |
| 9,403,051 B2 | 8/2016 | Cutler |
| 9,421,416 B2 | 8/2016 | Mortensen |
| 9,457,219 B2 | 10/2016 | Smith |
| 9,457,220 B2 | 10/2016 | Olson |
| 9,457,222 B2 | 10/2016 | Dalebout |
| 9,460,632 B2 | 10/2016 | Watterson |
| 9,463,356 B2 | 10/2016 | Rhea |
| 9,468,794 B2 | 10/2016 | Barton |
| 9,468,798 B2 | 10/2016 | Dalebout |
| 9,480,874 B2 | 11/2016 | Cutler |
| 9,492,704 B2 | 11/2016 | Mortensen |
| 9,498,668 B2 | 11/2016 | Smith |
| 9,517,378 B2 | 12/2016 | Ashby |
| 9,521,901 B2 | 12/2016 | Dalebout |
| 9,533,187 B2 | 1/2017 | Dalebout |
| 9,539,461 B2 | 1/2017 | Ercanbrack |
| 9,579,544 B2 | 2/2017 | Watterson |
| 9,586,086 B2 | 3/2017 | Dalebout |
| 9,586,090 B2 | 3/2017 | Watterson |
| 9,604,099 B2 | 3/2017 | Taylor |
| 9,616,276 B2 | 4/2017 | Dalebout |
| 9,616,278 B2 | 4/2017 | Olson |
| 9,623,281 B2 | 4/2017 | Hendrickson |
| 9,636,567 B2 | 5/2017 | Brammer |
| 9,675,839 B2 | 6/2017 | Dalebout |
| 9,682,307 B2 | 6/2017 | Dalebout |
| 9,694,234 B2 | 7/2017 | Dalebout |
| 9,694,242 B2 | 7/2017 | Ashby |
| 9,707,443 B2 | 7/2017 | Warren |
| 9,737,755 B2 | 8/2017 | Dalebout |
| 9,757,605 B2 | 9/2017 | Olson |
| 9,764,186 B2 | 9/2017 | Dalebout |
| 9,767,785 B2 | 9/2017 | Ashby |
| 9,795,822 B2 | 10/2017 | Smith |
| 9,808,672 B2 | 11/2017 | Dalebout |
| 9,849,326 B2 | 12/2017 | Smith |
| 9,878,210 B2 | 1/2018 | Watterson |
| 9,889,334 B2 | 2/2018 | Ashby |
| 9,889,339 B2 | 2/2018 | Douglass |
| 9,937,376 B2 | 4/2018 | McInelly |
| 9,937,377 B2 | 4/2018 | McInelly |
| 9,937,378 B2 | 4/2018 | Dalebout |
| 9,937,379 B2 | 4/2018 | Mortensen |
| 9,943,719 B2 | 4/2018 | Smith |
| 9,943,722 B2 | 4/2018 | Dalebout |
| 9,948,037 B2 | 4/2018 | Ashby |
| 9,968,816 B2 | 5/2018 | Olson |
| 9,968,821 B2 | 5/2018 | Finlayson |
| 9,968,823 B2 | 5/2018 | Cutler |
| 10,004,940 B2 | 6/2018 | Badarneh |
| 10,010,755 B2 | 7/2018 | Watterson |
| 10,010,756 B2 | 7/2018 | Watterson |
| 10,029,145 B2 | 7/2018 | Douglass |
| D826,350 S | 8/2018 | Hochstrasser |
| 10,046,196 B2 | 8/2018 | Ercanbrack |
| D827,733 S | 9/2018 | Hochstrasser |
| 10,065,064 B2 | 9/2018 | Smith |
| 10,071,285 B2 | 9/2018 | Smith |
| 10,085,586 B2 | 10/2018 | Smith |
| 10,086,254 B2 | 10/2018 | Watterson |

(56) References Cited

U.S. PATENT DOCUMENTS

| | | |
|---|---|---|
| 10,136,842 B2 | 11/2018 | Ashby |
| 10,186,161 B2 | 1/2019 | Watterson |
| 10,188,890 B2 | 1/2019 | Olson |
| 10,207,143 B2 | 2/2019 | Dalebout |
| 10,207,145 B2 | 2/2019 | Tyger |
| 10,207,147 B2 | 2/2019 | Ercanbrack |
| 10,207,148 B2 | 2/2019 | Powell |
| 10,212,994 B2 | 2/2019 | Watterson |
| 10,220,259 B2 | 3/2019 | Brammer |
| 10,226,396 B2 | 3/2019 | Ashby |
| 10,226,664 B2 | 3/2019 | Dalebout |
| 10,252,109 B2 | 4/2019 | Watterson |
| 10,258,828 B2 | 4/2019 | Dalebout |
| 10,272,317 B2 | 4/2019 | Watterson |
| 10,279,212 B2 | 5/2019 | Dalebout |
| 10,293,211 B2 | 5/2019 | Watterson |
| D852,292 S | 6/2019 | Cutler |
| 10,343,017 B2 | 7/2019 | Jackson |
| 10,376,736 B2 | 8/2019 | Powell |
| 10,388,183 B2 | 8/2019 | Watterson |
| 10,391,361 B2 | 8/2019 | Watterson |
| D864,320 S | 10/2019 | Weston |
| D864,321 S | 10/2019 | Weston |
| 10,426,989 B2 | 10/2019 | Dalebout |
| 10,433,612 B2 | 10/2019 | Ashby |
| 10,441,840 B2 | 10/2019 | Dalebout |
| 10,449,416 B2 | 10/2019 | Dalebout |
| D868,909 S | 12/2019 | Cutler |
| 10,492,519 B2 | 12/2019 | Capell |
| 10,493,349 B2 | 12/2019 | Watterson |
| 10,500,473 B2 | 12/2019 | Watterson |
| 10,543,395 B2 | 1/2020 | Powell et al. |
| 10,561,877 B2 | 2/2020 | Workman |
| 10,561,893 B2 | 2/2020 | Chatterton |
| 10,561,894 B2 | 2/2020 | Dalebout |
| 10,569,121 B2 | 2/2020 | Watterson |
| 10,569,123 B2 | 2/2020 | Hochstrasser |
| 10,617,913 B2 * | 4/2020 | Dhawan ................ A63F 13/85 |
| 10,670,086 B2 * | 6/2020 | Wittig .................... F16D 23/12 |
| 2002/0016235 A1 | 2/2002 | Ashby |
| 2002/0077221 A1 | 6/2002 | Dalebout |
| 2002/0159253 A1 | 10/2002 | Dalebout |
| 2003/0045406 A1 | 3/2003 | Stone |
| 2004/0091307 A1 | 5/2004 | James |
| 2004/0171464 A1 | 9/2004 | Ashby |
| 2004/0171465 A1 | 9/2004 | Hald |
| 2005/0049123 A1 | 3/2005 | Dalebout |
| 2005/0077805 A1 | 4/2005 | Dalebout |
| 2005/0107229 A1 | 5/2005 | Wickens |
| 2005/0164839 A1 | 7/2005 | Watterson |
| 2005/0272577 A1 | 12/2005 | Olson |
| 2007/0117683 A1 | 5/2007 | Ercanbrack |
| 2007/0254778 A1 | 11/2007 | Ashby |
| 2008/0051256 A1 | 2/2008 | Ashby |
| 2008/0242520 A1 | 10/2008 | Hubbard |
| 2008/0300110 A1 | 12/2008 | Smith |
| 2009/0105052 A1 | 4/2009 | Dalebout |
| 2010/0242246 A1 | 9/2010 | Dalebout |
| 2012/0071301 A1 | 3/2012 | Kaylor |
| 2012/0178592 A1 | 7/2012 | Chang |
| 2012/0237911 A1 | 9/2012 | Watterson |
| 2012/0295774 A1 | 11/2012 | Dalebout |
| 2013/0123083 A1 | 5/2013 | Sip |
| 2013/0165195 A1 | 6/2013 | Watterson |
| 2013/0172152 A1 | 7/2013 | Watterson |
| 2013/0172153 A1 | 7/2013 | Watterson |
| 2013/0178334 A1 | 7/2013 | Brammer |
| 2013/0178768 A1 | 7/2013 | Dalebout |
| 2013/0190136 A1 | 7/2013 | Watterson |
| 2013/0196298 A1 | 8/2013 | Watterson |
| 2013/0196821 A1 | 8/2013 | Watterson |
| 2013/0196822 A1 | 8/2013 | Watterson |
| 2013/0218585 A1 | 8/2013 | Watterson |
| 2013/0244836 A1 | 9/2013 | Maughan |
| 2013/0267383 A1 | 10/2013 | Watterson |
| 2013/0268101 A1 | 10/2013 | Brammer |
| 2013/0274067 A1 | 10/2013 | Watterson |
| 2013/0281241 A1 | 10/2013 | Watterson |
| 2013/0334001 A1* | 12/2013 | Albrecht ................ F16D 11/04 192/69.7 |
| 2014/0024499 A1 | 1/2014 | Watterson |
| 2014/0073970 A1 | 3/2014 | Ashby |
| 2014/0121071 A1 | 5/2014 | Strom |
| 2014/0135173 A1 | 5/2014 | Watterson |
| 2014/0274574 A1 | 9/2014 | Shorten |
| 2014/0274579 A1 | 9/2014 | Olson |
| 2014/0287884 A1 | 9/2014 | Buchanan |
| 2014/0309085 A1 | 10/2014 | Watterson |
| 2015/0045190 A1 | 2/2015 | Keiser |
| 2015/0182779 A1 | 7/2015 | Dalebout |
| 2015/0182781 A1 | 7/2015 | Watterson |
| 2015/0238817 A1 | 8/2015 | Watterson |
| 2015/0250418 A1 | 9/2015 | Ashby |
| 2015/0251055 A1 | 9/2015 | Ashby |
| 2015/0253735 A1 | 9/2015 | Watterson |
| 2015/0253736 A1 | 9/2015 | Watterson |
| 2015/0258560 A1 | 9/2015 | Ashby |
| 2016/0058335 A1 | 3/2016 | Ashby |
| 2016/0063615 A1 | 3/2016 | Watterson |
| 2016/0092909 A1 | 3/2016 | Watterson |
| 2016/0101311 A1 | 4/2016 | Workman |
| 2016/0107065 A1 | 4/2016 | Brammer |
| 2016/0121074 A1 | 5/2016 | Ashby |
| 2016/0148535 A1 | 5/2016 | Ashby |
| 2016/0148536 A1 | 5/2016 | Ashby |
| 2016/0158595 A1 | 6/2016 | Dalebout |
| 2016/0346595 A1 | 12/2016 | Dalebout et al. |
| 2017/0036053 A1 | 2/2017 | Smith et al. |
| 2017/0056711 A1 | 3/2017 | Dalebout |
| 2017/0056715 A1 | 3/2017 | Dalebout |
| 2017/0124912 A1 | 5/2017 | Ashby |
| 2017/0193578 A1 | 7/2017 | Watterson |
| 2017/0266489 A1 | 9/2017 | Douglass |
| 2017/0266533 A1 | 9/2017 | Dalebout |
| 2017/0270820 A1 | 9/2017 | Ashby |
| 2018/0001135 A1 | 1/2018 | Powell |
| 2018/0036585 A1 | 2/2018 | Powell |
| 2018/0085630 A1 | 3/2018 | Capell |
| 2018/0089396 A1 | 3/2018 | Capell |
| 2018/0099116 A1 | 4/2018 | Ashby |
| 2018/0099180 A1 | 4/2018 | Wilkinson |
| 2018/0111034 A1 | 4/2018 | Watterson |
| 2018/0117383 A1 | 5/2018 | Workman |
| 2018/0117385 A1 | 5/2018 | Watterson |
| 2018/0117393 A1 | 5/2018 | Ercanbrack |
| 2018/0154209 A1 | 6/2018 | Watterson |
| 2018/0200566 A1 | 7/2018 | Weston |
| 2019/0058370 A1 | 2/2019 | Tinney |
| 2019/0080624 A1 | 3/2019 | Watterson |
| 2019/0151698 A1 | 5/2019 | Olson |
| 2019/0168072 A1 | 6/2019 | Brammer |
| 2019/0192898 A1 | 6/2019 | Dalebout |
| 2019/0192952 A1 | 6/2019 | Powell |
| 2019/0209893 A1 | 7/2019 | Watterson |
| 2019/0223612 A1 | 7/2019 | Watterson |
| 2019/0232112 A1 | 8/2019 | Dalebout |
| 2019/0269958 A1 | 9/2019 | Dalebout |
| 2019/0269971 A1 | 9/2019 | Capell |
| 2019/0275366 A1 | 9/2019 | Powell |
| 2019/0282852 A1 | 9/2019 | Dalebout |
| 2019/0328079 A1 | 10/2019 | Ashby |
| 2019/0329091 A1 | 10/2019 | Powell |
| 2019/0376585 A1 | 12/2019 | Buchanan |
| 2020/0009417 A1 | 1/2020 | Dalebout |
| 2020/0016459 A1 | 1/2020 | Smith |
| 2020/0238130 A1 | 7/2020 | Silcock |
| 2020/0254295 A1 | 8/2020 | Watterson |
| 2020/0254309 A1 | 8/2020 | Watterson |
| 2020/0254311 A1 | 8/2020 | Watterson |

FOREIGN PATENT DOCUMENTS

| | | | |
|---|---|---|---|
| GB | 2169363 A * | 7/1986 | ............. F16D 41/04 |
| JP | 10167158 | 6/1998 | |

(56) References Cited

FOREIGN PATENT DOCUMENTS

| | | |
|---|---|---|
| JP | 2017036009 | 2/2017 |
| KR | 20110001324 | 2/2011 |
| KR | 101499823 | 3/2015 |
| TW | 407113 | 10/2000 |
| TW | M245969 | 10/2004 |
| TW | I264321 | 10/2006 |
| TW | M442167 | 12/2012 |
| TW | I579197 | 4/2017 |
| WO | WO2013138303 | 9/2013 |
| WO | 2017060895 | 4/2017 |

OTHER PUBLICATIONS

English Translation of Office Action and Search Report issued in Taiwan Patent Application No. 107143798 dated Aug. 22, 2019.
WEBPAGE: https://www.proform.com/exercise-bikes/tour-de-france-pro-5-bike updated Aug. 22, 2016.
International Search Report and Written Opinion issued in PCT/US2018/013626 dated May 10, 2018.
English Translation of Office Action and Search Report issued in Taiwan Patent Application No. 106133333 dated Apr. 19, 2018.
U.S. Appl. No. 29/021,127, filed Sep. 16, 2019, Gordon Cutler.
U.S. Appl. No. 13/088,007, filed Apr. 15, 2011, Scott R. Watterson.
U.S. Appl. No. 15/973,176, filed May 7, 2018, Melanie Douglass.
U.S. Appl. No. 16/879,376, filed May 20, 2020, David Hays.
U.S. Appl. No. 16/992,870, filed Aug. 13, 2020, Gaylen Ercanbrack.
U.S. Appl. No. 16/992,886, filed Aug. 13, 2020, William T. Dalebout.
U.S. Appl. No. 17/067,310, filed Oct. 9, 2020, Jared Willardson.
U.S. Appl. No. 17/096,350, filed Nov. 12, 2020, William T. Dalebout.
U.S. Appl. No. 62/897,113, filed Sep. 9, 2019, Megan Jane Ostler.
U.S. Appl. No. 62/991,378, filed Mar. 18, 2020, Chris Nascimento.
U.S. Appl. No. 62/994,204, filed Mar. 24, 2020, Chase Brammer.
U.S. Appl. No. 63/073,081, filed Sep. 1, 2020, Darren C. Ashby.
U.S. Appl. No. 63/079,697, filed Sep. 17, 2020, Jared Willardson.
U.S. Appl. No. 63/086,793, filed Oct. 2, 2020, Darren C. Ashby.
Office Action in Chinese Application No. 201880079356.5, dated Dec. 31, 2020, 13 pages.
Extended European Search Report for EP Application No. 18885683.5, dated Jul. 27, 2021, 9 pages.

\* cited by examiner

SYSTEMS AND METHODS FOR SELECTIVELY ROTATIONALLY FIXING A PEDALED DRIVETRAIN

CROSS-REFERENCE TO RELATED APPLICATIONS

This application claims priority to provisional patent application No. 62/596,815 entitled "SYSTEMS AND METHODS FOR SELECTIVELY ROTATIONALLY FIXING A PEDALED DRIVETRAIN" filed Dec. 9, 2017 and provisional patent application No. 62/609,718 entitled "SYSTEMS AND METHODS FOR SELECTIVELY ROTATIONALLY FIXING A PEDALED DRIVETRAIN" filed Dec. 22, 2017, which applications are herein incorporated by reference for all that they disclose.

BACKGROUND

Technical Field

This disclosure generally relates to pedaled drivetrains. More particularly, this disclosure generally relates to selectively changing a pedaled drivetrain from transmission of torque in a first direction only to transmission of torque in both rotational directions.

Background and Relevant Art

Cyclic motion can be very efficient power output for transportation and/or movement and is used in bicycles, tricycles, and other land-based vehicles; pedal boats and other water vehicles; and ultralight aircraft, microlight aircraft, and other aerial vehicles. Similarly, the biomechanics of the cyclic motion may produce lower impact on a user, reducing the risk of joint injury, skeletal injury, muscle injury, or combinations thereof. In contrast to other exercises such as running, cyclic motion may avoid repeated impacts on the body. Therefore, cyclic motion is a common exercise technique for fitness and/or rehabilitation. For example, elliptical running machines, stationary bicycles, handcycles, and other cyclic and/or rotary motion machines may provide resistance training or endurance training with little or no impacts upon the user's body.

A human-powered cycling system may have a drivetrain to direct energy from a user to a wheel, flywheel, or other rotating component of the cycling system. The drivetrain may transmit energy from the user to a rotational axis in only one direction about the rotational axis, or the drivetrain may transmit energy from the user to the rotational axis in both directions about the rotational axis. For example, many conventional bicycles include a freewheel hub in the rear of the bicycle that may receive energy from a drive mechanism, such as a chain, to rotate the rear wheel in a forward direction and propel the bicycle. Rearward rotation of the drive mechanism relative to the wheel may be not transferred. For example, "backpedaling" on a bicycle with a freewheel hub may result in little or no energy transmitted to the rear wheel. Additionally, the freewheel hub may freely rotate in the forward direction relative to the drive mechanism (i.e., rotate in the forward direction faster than the drive mechanism), allowing the bicycle to roll forward faster than a user pedals the drive mechanism.

Some bicycles may have a direct drive or "fixed gear" drivetrain that allows a user to slow a forward motion and/or propel the bicycle in a rearward direction by backpedaling. In such bicycles, the direct drive may couple the drive mechanism to the wheel, such that rotational movement of the drive mechanism in either direction is transmitted to the wheel and rotational movement of the wheel in either direction is similarly transmitted to the drive mechanism.

Conventional exercise devices utilize either a freewheel hub to simulate a conventional bicycle experience for exercise and/or training purposes or a direct drive to increase the energy requirements from the user and provide a more intense training experience.

SUMMARY

In some embodiments, a pedaled drivetrain includes a drive mechanism, a wheel, a freewheel hub, and a locking mechanism. The wheel has a rotational axis. The freewheel hub connects the drive mechanism to the wheel, and the freewheel hub transmits torque from the drive mechanism to the wheel in a first rotational direction around the rotational axis. The locking mechanism has a locked state and an unlocked state. The locked state rotationally fixes a component of the drive mechanism to the wheel relative to the rotational axis.

In some embodiments, a cycling system includes a frame, handlebars supported by the frame, and a drivetrain supported by the frame. The drivetrain includes a drive mechanism configured to receive an input torque from a user, a wheel, and a freewheel hub connecting the drive mechanism to the wheel and configured to transmit the input torque from the drive mechanism to the wheel in a first rotational direction of the wheel only. The drivetrain further includes a locking mechanism connected to the drive mechanism and the wheel. The locking mechanism has a locked state and an unlocked state. The locked state is configured to transmit at least 95% of the input torque to the wheel in the first rotational direction and in a second rotational direction of the wheel. The second rotational direction is opposite the first rotational direction.

In some embodiments, a method of transmitting torque in a pedaled drivetrain includes receiving a first input force with at least one pedal, converting the first input force to a first input torque in a drivetrain in a first rotational direction of the drivetrain, and transmitting the first input torque through a freewheel hub to a wheel in a first rotational direction of the wheel. A locking mechanism is then moved from an unlocked state to a locked state to rotationally fix a component of the drivetrain to the wheel. The method further includes receiving a second input force at the at least one pedal, converting the second input force to a second input torque in a drivetrain in a second rotational direction of the drivetrain opposite the first rotational direction of the drivetrain; and transmitting the second input torque through the locking mechanism to the wheel in the second rotational direction of the wheel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 4-1 is a side schematic representation of a drivetrain and wheel in an unlocked state, according to at least one embodiment of the present disclosure;

FIG. 4-2 is a side schematic representation of the embodiment of a drivetrain and wheel of FIG. 4-1 in an unlocked state with the wheel rotating without an input force from the drivetrain;

FIG. 6-1 is a right perspective view of an embodiment of a locking mechanism in an unlocked state, according to at least one embodiment of the present disclosure;

FIG. 6-2 is a right perspective view of the embodiment of a locking mechanism of FIG. 6-1 in a locked state;

DETAILED DESCRIPTION

In some embodiments of a human-powered cycling system according to the present disclosure, a drivetrain may include a freewheel hub with a selectively actuatable locking mechanism to bypass the freewheel hub and create a direct drive linkage. As described herein, a lockable hub may provide additional training and/or propulsion options while increasing efficiency, safety, and enjoyment for a user.

Figure 1:
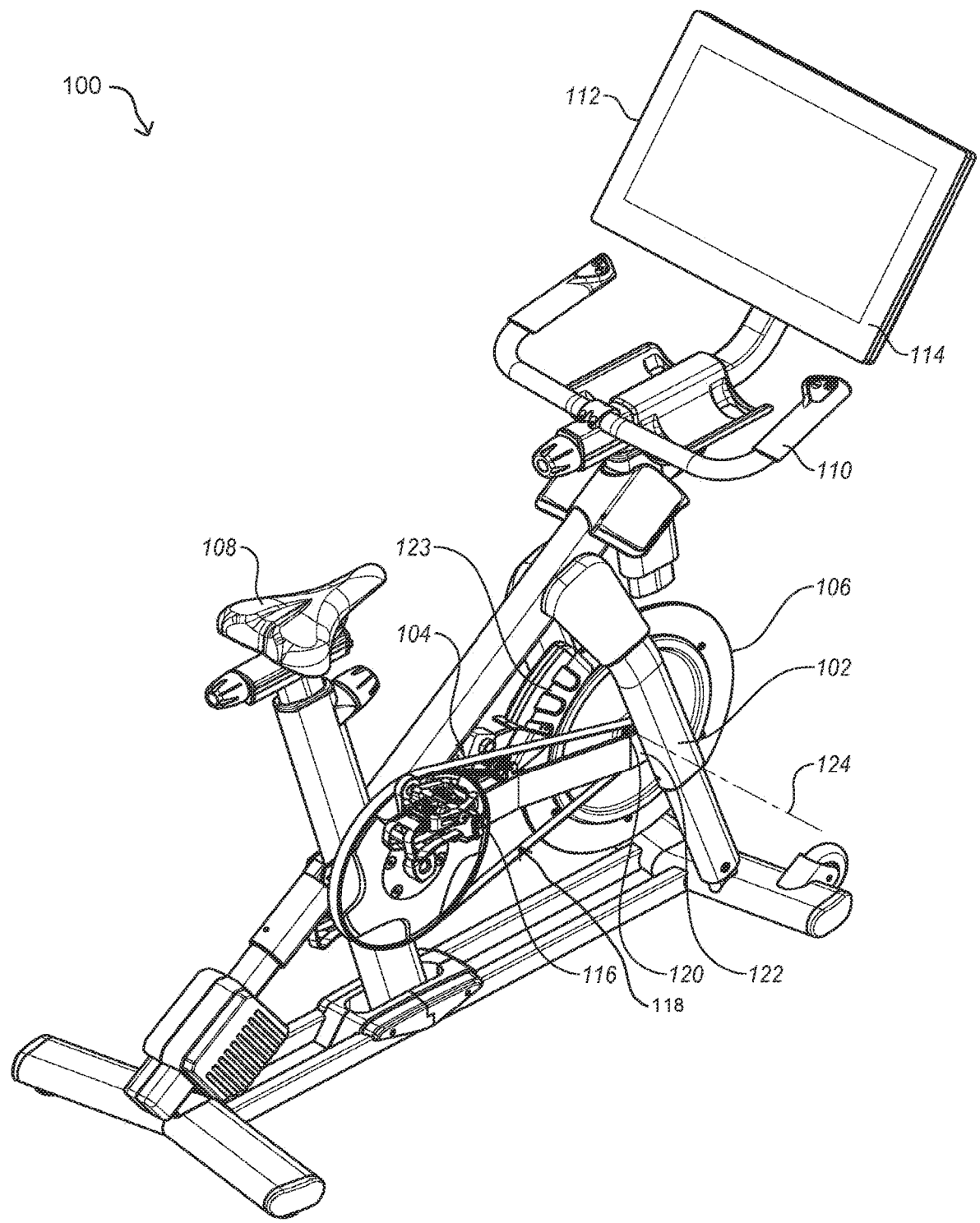
FIG. 1 is a perspective view of an exercise bicycle, according to at least one embodiment of the present disclosure.
Figure 2:
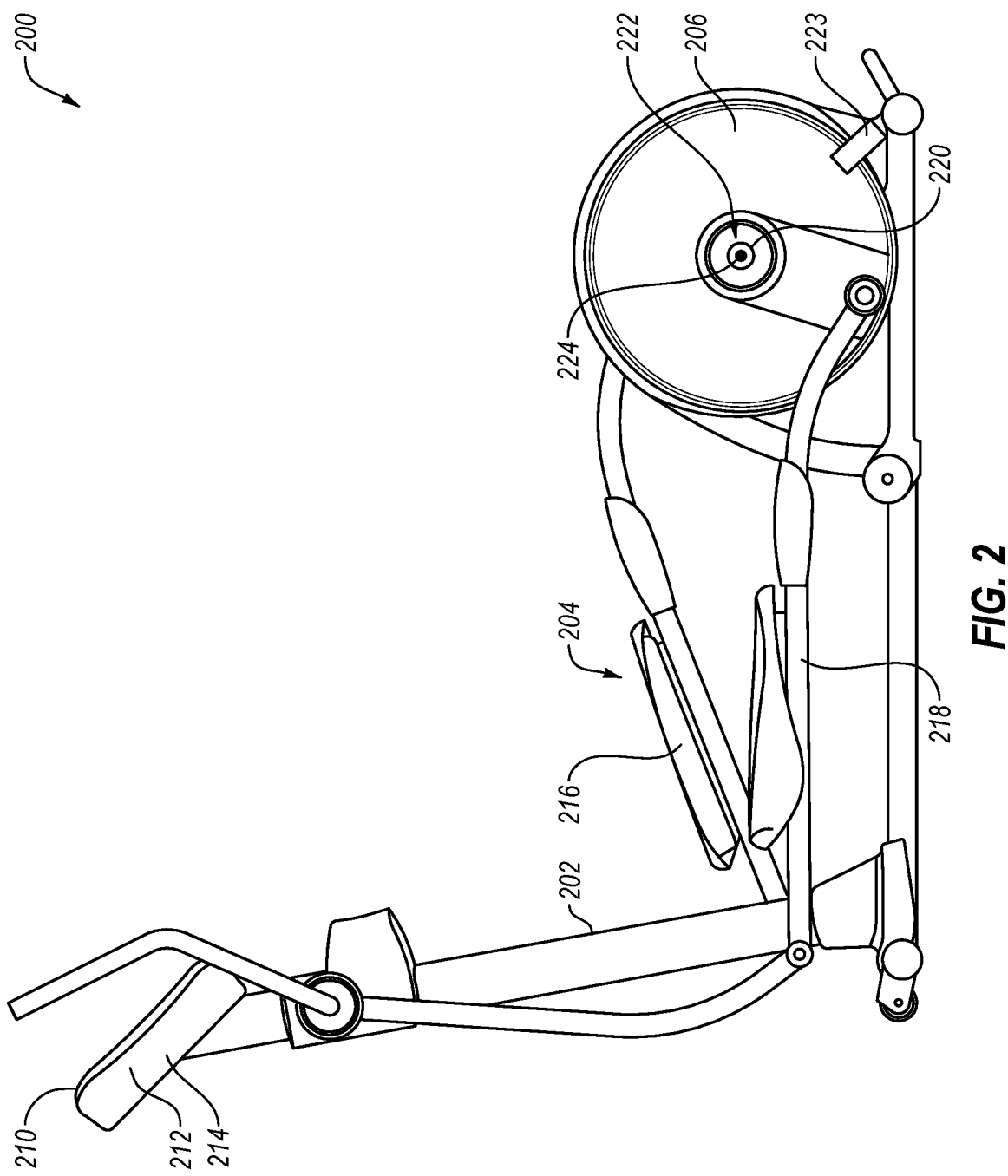
FIG. 2 is a side view of an elliptical trainer, according to at least one embodiment of the present disclosure.
Figure 3:
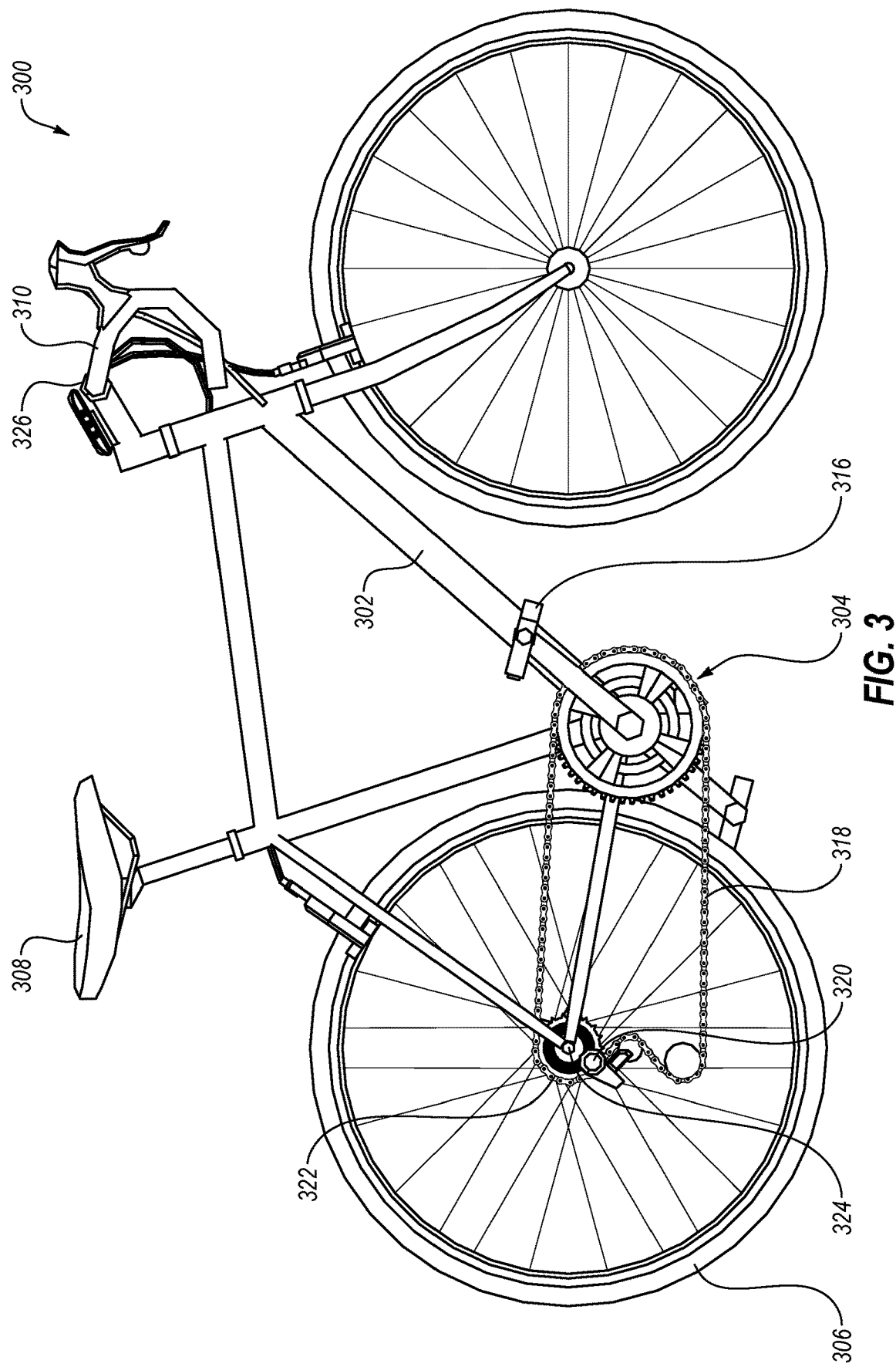
FIG. 3 is a side view of a bicycle, according to at least one embodiment of the present disclosure.

FIG. 1 through FIG. 3 are examples of human-powered cycling systems. Each receives a circular or elliptical input from a user, and may transmit that input to a wheel or flywheel in one or two rotational directions. FIG. 1 is a perspective view of an embodiment of an exercise bicycle 100, according to the present disclosure. The exercise bicycle 100 may include a frame 102 that supports a drivetrain 104 and at least one wheel 106. The frame 102 may further support a seat 108 for a user to sit upon, handlebars 110 for a user to grip, one or more displays 112, or combinations thereof. For example, some embodiments of an exercise bicycle 100 may include a seat 108 but lack handlebars 110, as a user may recline in the seat 108 without a need to stabilize herself during riding. Such embodiments may include a display 112 despite lacking handlebars 110.

In some embodiments, an exercise bicycle 100 may use one or more displays 112 to display feedback or other data regarding the operation of the exercise bicycle 100. In some embodiments, the drivetrain 104 may be in data communication with the display 112 such that the display 112 presents real-time information collected from one or more sensors on the drivetrain 104. For example, the display 112 may present information to the user regarding cadence, wattage, simulated distance, duration, simulated speed, resistance, incline, heart rate, respiratory rate, other measured or calculated data, or combinations thereof. In other examples, the display 112 may present use instructions to a user, such as workout instructions for predetermined workout regimens (stored locally or accessed via a network); live workout regimens, such as live workouts broadcast via a network connection; or simulated bicycle rides, such as replicated stages of real-world bicycle races. In yet other examples, the display 112 may present one or more entertainment options to a user during usage of the exercise bicycle 100. The display 112 may display broadcast or cable television, locally stored videos and/or audio, video and/or streamed via a network connection, video and/or audio displayed from a connected device (such as a smartphone, laptop, or other computing device connected to the display 112) or other entertainment sources. In other embodiments, an exercise bicycle 100 may lack a display 112 and provide information regarding the drivetrain 104 or other exercise session data to an external or peripheral device. For example, the exercise bicycle 100 may communicate with a smartphone, wearable device, tablet computer, laptop, or other electronic device to allow a user to log their exercise information.

The exercise bicycle 100 may have a computing device 114 in data communication with one or more components of the exercise bicycle 100. For example, the computing device 114 may allow the exercise bicycle 100 to collect information from the drivetrain 104 and display such information in real-time. In other examples, the computing device 114 may send a command to activate one or more components of the frame 102 and/or drivetrain 104 to alter the behavior of the exercise bicycle 100. For example, the frame 102 may move to simulate an incline or decline displayed on the display 112 during a training session. Similarly, the drivetrain 104 may change to alter resistance, gear, or other characteristics to simulate different experiences for a user. The drivetrain 104 may increase resistance to simulate climbing a hill or other experience that requires greater energy input from the user, or the drivetrain 104 may change gear (e.g., physically or "virtually") and the distance calculated by the computing device 114 may reflect the selected gear.

In some embodiments, the drivetrain 104 may be in data communication with the display 112 such that the drivetrain 104 may change in response to simulate one or more portions of an exercise experience. The display 112 may present an incline to a user and the drivetrain 104 may increase in resistance to reflect the simulated incline. In at least one embodiment, the display 112 may present an incline to the user and the frame 102 may incline and the drivetrain 104 may increase resistance simultaneously to create an immersive experience for a user.

The computing device 114 may allow tracking of exercise information, logging of exercise information, communication of exercise information to an external electronic device, or combinations thereof with or without a display 112. For example, the computing device 114 may include a communications device that allows the computing device 114 to communicate data to a third-party storage device (e.g., internet and/or cloud storage) that may be subsequently accessed by a user.

In some embodiments, the drivetrain 104 may include an input component that receives an input force from the user and a drive mechanism that transmits the force through the drivetrain 104 to a hub that moves a wheel 106. In the embodiment illustrated in FIG. 1, the input component is a set of pedals 116 that allow the user to apply a force to a belt 118. The belt 118 may rotate an axle 120. The rotation of the axle 120 may be transmitted to a wheel 106 by a hub 122. In other embodiments, the belt 118 may rotate a portion of the hub 122, and the wheel 106 and hub 122 may be supported by the axle 120 while remaining rotationally uncoupled from the axle 120. The present disclosure contemplates a drive mechanism engaging with either the axle 120 and/or a portion of the hub 122. In some embodiments, the wheel 106 may be a flywheel.

The hub 122 may be a freewheel hub 122 that allows the wheel 106 to continue rotating if the rotational velocity of the wheel 106 exceeds that of the axle 120. The hub 122 may be a direct drive or "fixed gear" hub 122 that communicates torque between the axle 120 and the wheel 106 in both directions about the rotational axis 124 of the wheel 106, axle 120, and hub 122. In some embodiments, the hub 122 may be selectively movable from a freewheel behavior in an unlocked state to a direct drive behavior in a locked state to further enhance a user's experience and/or provide additional exercise options to a user.

The unlocked state may transmit an input torque from the drivetrain to a wheel in a first rotational direction and may transmit little or no torque in a second rotational direction. For example, the unlocked state may transmit substantially all of an input torque (less drivetrain losses and up to a tensile or other yield strength of the components) in the first rotational direction and less than 5% of an input torque in the second rotational direction. In another example, the unlocked state may transmit substantially all of an input torque in the first rotational direction and less than 3% of an input torque in the second rotational direction. In yet another example, the unlocked state may transmit substantially all of an input torque in the first rotational direction and less than 1% of an input torque in the second rotational direction. In at least some examples, the unlocked state may transmit less than 0.1% of an input torque in the second rotational direction.

The locked state may transmit substantially all of an input torque (less drivetrain losses and up to a tensile or other yield strength of the components) in the first rotational direction and in the second rotational direction. In some embodiments, the locked state may transmit greater than 95% of an input torque in the first rotational direction and in the second rotational direction. In other embodiments, the locked state may transmit greater than 97% of an input torque in the first rotational direction and in the second rotational direction. In yet other embodiments, the locked state may transmit greater than 99% of an input torque in the first rotational direction and in the second rotational direction.

In some embodiments, the locked state may transmit greater than 300 Newton-meters (N-m) of torque from the drivetrain to the wheel in the first rotational direction and second rotational direction without slipping of the drivetrain and wheel relative to one another. In other embodiments, the locked state may transmit greater than 400 N-m of torque from the drivetrain to the wheel in the first rotational direction and second rotational direction without slipping of the drivetrain and wheel relative to one another. In some embodiments, the locked state may transmit greater than 500 N-m of torque from the drivetrain to the wheel in the first rotational direction and second rotational direction without slipping of the drivetrain and wheel relative to one another.

In some embodiments in the unlocked state, it is possible for the pedals 116 of the drivetrain 104 to continue moving after input from a user has ceased. For example, the rotational inertia of the wheel 106 may urge the pedals 116 to continue rotating without further input from the user. For safety purposes, a brake 123 may be positioned on or supported by the frame 102 and configured to stop or slow the wheel 106 or other part of the drivetrain 104.

In some embodiments, the brake 123 may be a friction brake, such as a drag brake, a drum brake, caliper brake, a cantilever brake, or a disc brake, that may be actuated mechanically, hydraulically, pneumatically, electronically, by other means, or combinations thereof. In other embodiments, the brake 123 may be a magnetic brake that slows and/or stops the movement of the wheel 106 and/or drivetrain 104 through the application of magnetic fields. In some examples, the brake may be manually forced in contact with the wheel 106 by a user rotating a knob to move the brake 123. In other examples, the brake 123 may be a disc brake with a caliper hydraulically actuated with a lever on the handlebars 110. In yet other examples, the brake may be actuated by the computing device 114 in response to one or more sensors.

In some embodiments, the changing of the drivetrain 104 from a freewheel (unidirectional) drivetrain to a direct-drive (bi-directional) drivetrain may be limited by a lockout device. For example, the drivetrain 104 may be movable between the locked state and the unlocked state below a defined rotational velocity of the wheel 106. In some embodiments, the lockout device may prevent the movement between the locked state and the unlocked state when the wheel 106 has a rotational velocity greater than 60 revolutions per minute (RPM). In other embodiments, the lockout device may prevent the movement between the locked state and the unlocked state when the wheel 106 has a rotational velocity greater than 30 RPM. In yet other embodiment, the lockout device may prevent the movement between the locked state and the unlocked state when the wheel 106 has a rotational velocity greater than 10 RPM. In further embodiments, the lockout device may prevent the movement between the locked state and the unlocked state when the wheel 106 has a rotational velocity greater than 0 RPM. In at least one embodiment, the lockout device may prevent the movement between the locked state and the unlocked state unless the brake 123 is engaged with the wheel 106 and/or drivetrain 104 to prevent movement of the wheel 106 and/or drivetrain.

In other embodiments, the lockout device and/or the safety brake may be in data communication with one or more sensors, such as a speed sensor, a torque sensor, a wattmeter, or other sensor to measure and monitor the user's inputs and movement of the drivetrain 104 and/or wheel 106.

FIG. 2 is another embodiment of a cycling system that may be used for exercise. An elliptical trainer 200 may include a frame 202 that supports a drivetrain 204 connected to a wheel 206 with a safety brake 223. The frame 202 may support a display 212 and/or computing device 214 to present, track, log, store, or communicate information for a user. In some embodiments, the drivetrain 204 may have inputs from the user including both handlebars 210 and pedals 216. For example, the drive mechanism, such as the linkage 218 of the illustrated embodiment, may receive force from the user through movement of the handlebars 210 and/or the pedals 216. The pedals 216 may cycle through an elliptical path, while the handlebars 210 may oscillate in an arcuate path (arrows A and B), to drive the linkage 218. In other embodiments, the drivetrain 204 may have stationary handlebars 210 and the pedals 216 may drive the linkage 218 independently of the handlebars 210. The linkage 218 may rotate an axle 220, and the rotation of the axle 220 may be transmitted to the wheel 206 by a hub 222.

The hub 222 may be a freewheel hub 222 that allows the wheel 206 to continue rotating if the rotational velocity of the wheel 206 exceeds that of the axle 220. The hub 222 may be a direct drive hub 222 that communicates torque between the axle 220 and the wheel 206 in both directions about the rotational axis 224 of the wheel 206, axle 220, and hub 222. In some embodiments, the hub 222 may be selectively movable from a freewheel behavior to a direct drive behavior to further enhance a user's experience and/or provide additional exercise options to a user.

FIG. 3 is a side view of an embodiment of another cycling system, according to the present disclosure. In some embodiments, a bicycle 300 may have a frame 302 that supports a drivetrain 304 configured to rotate a wheel 306 and seat 308 and/or handlebars 310 to support a user. The drivetrain 304 may include pedals 316 to receive input force from a user and drive mechanism, such as a chain 318 or belt, to transmit the force to an axle 320. A hub 322 may transmit torque from the axle 320 to the wheel 306 to rotate the wheel 306 about a rotational axis 324.

The hub 322 may be a freewheel hub 322 that allows the wheel 306 to continue rotating if the rotational velocity of the wheel 306 exceeds that of the axle 320. The hub 322 may be a direct drive hub 322 that communicates torque between the axle 320 and the wheel 306 in both directions about the rotational axis 324 of the wheel 306, axle 320, and hub 322. In some embodiments, the hub 322 may be selectively movable from a freewheel behavior to a direct drive behavior to further enhance a user's experience and/or provide additional exercise options to a user. In some embodiments, the hub 322 may be movable between a locked position and an unlocked position by a controller 326 positioned on the handlebars 310 or other location accessible by the user during use of the bicycle 300.

Figures 1, 4:
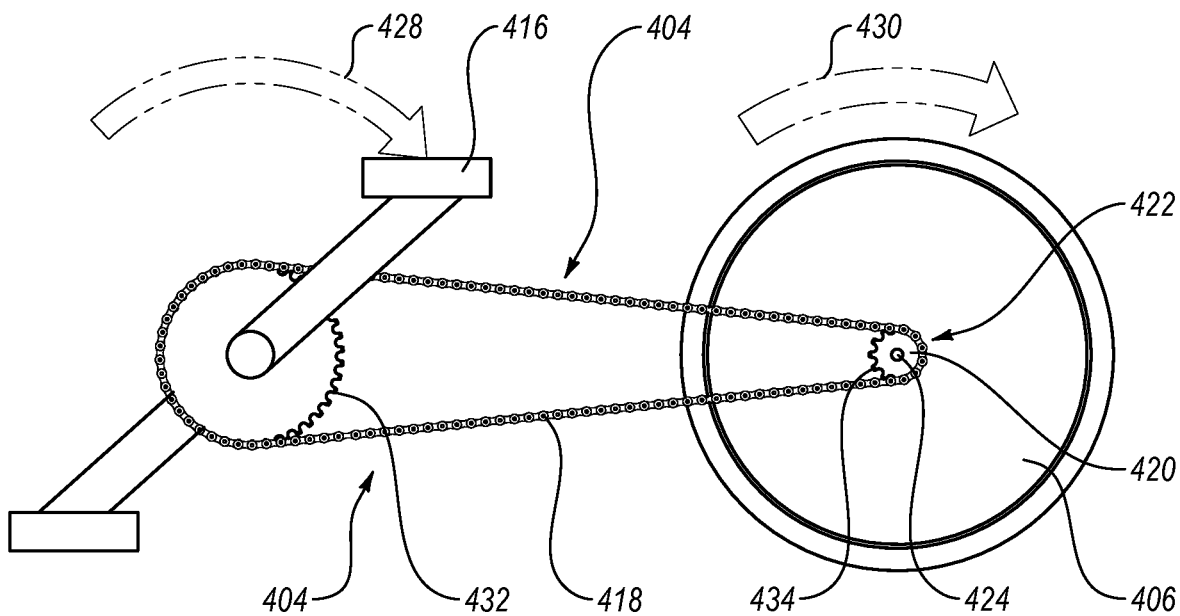
Figures 2, 4:
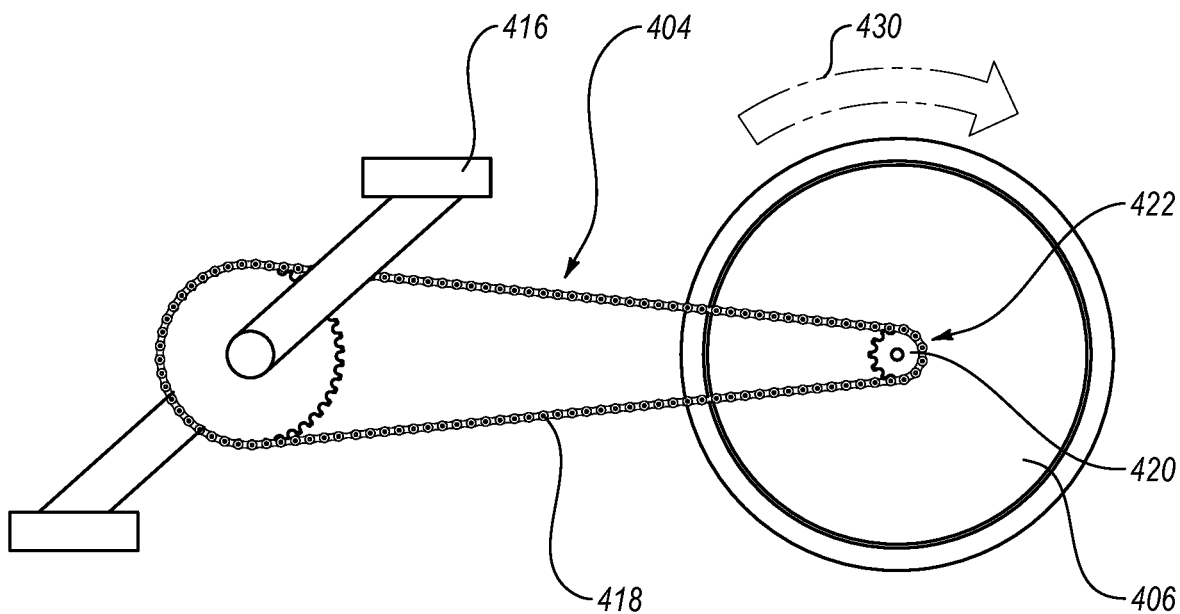
Figure 5:
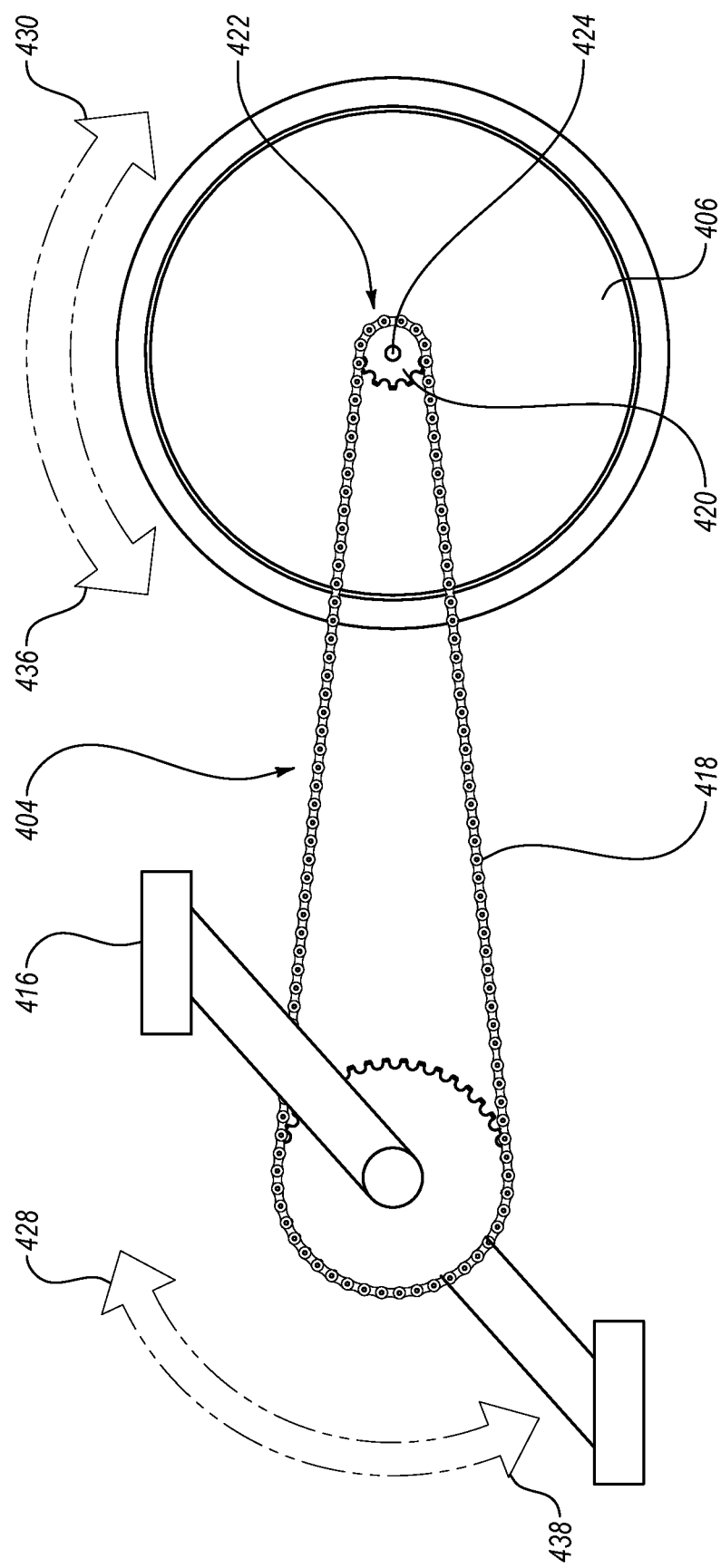
FIG. 5 is a side schematic representation of the embodiment of a drivetrain and wheel of FIGS. 4-1 and 4-2 in a locked state.

FIG. 4-1 through FIG. 5 are schematic representations of an embodiment of a drivetrain and wheel that may be used in the cycling systems described herein (e.g., the exercise bicycle 100 described in relation to FIG. 1, elliptical trainer 200 described in relation to FIG. 2, and bicycle 300 described in relation to FIG. 3). A pedaled drivetrain 404 may be configured to rotate a wheel 406. A "pedaled drivetrain", as used herein, may include any linkage, mechanism, or system that receives an input force from a human in a cyclic pattern and transmits that force to rotate a wheel. For example, a pedaled drivetrain may include platform pedals, as are common on exercise bicycles and conventional bicycles for transportation. In other examples, a pedaled drivetrain may include "clipless pedals" that engage with a cleat on a user's shoe to allow more efficient power transfer to the drivetrain throughout the pedal stroke. In yet other examples, a pedaled drivetrain may include hand pedals or grips that allow a user to cycle the pedals of the drivetrain with their hands, for example, to strengthen or rehabilitate the user's upper body. In further examples, a drivetrain having hand pedals may allow a user with limited or no lower body control to operate a cycling system for exercise and/or transportation.

FIG. 4-1 is a side view of a drivetrain 404 in an unlocked state transmitting a forward torque 428 from pedals 416 to a wheel 406 about a rotational axis 424 of the wheel 406 in a first rotational direction 430. The drivetrain 404 may include a drive mechanism that transmits the force from the pedals 416 to the wheel 406. The chain 418 may engage with a first gear 432 rotatable by the pedals 416. The chain 418 may also engage with a second gear 434 on the axle 420 to apply a torque to the axle 420 around the rotational axis 424 and rotate the axle 420. The axle 420 transmits torque to the wheel through a hub 422. In FIG. 4-1, the hub 422 is a freewheel hub that transmits torque in the first rotational direction 430.

FIG. 4-2 illustrates the drivetrain 404 of FIG. 4-1 with the pedals 416 moving at a slower rotational rate than the wheel 406 in the first rotational direction 430. For example, the pedals 416 may be stationary as the wheel 406 rotates due to rotational inertia or due to contact with the ground while a bicycle is moving. In other examples, the pedals 416 may be rotating in a second rotational direction, opposite the first rotational direction. The pedals 416 may move the chain 418 and axle 420 in the second rotational direction, and the freewheel hub 422 may transmit little or no torque to the wheel 406 to disrupt the rotation of the wheel 406 in the first rotational direction 430.

FIG. 5 is a side view of the drivetrain 404 of FIG. 4-1 in a second, locked state. In the locked state, the drivetrain 404 may transmit torque to the wheel 406 in both the first rotational direction 430 and in an opposing second rotational direction 436 about the rotational axis 424. For example, in the locked state, the torque from rotation of the axle 420 is directly transmitted to the wheel 406 in either rotational direction.

For example, a user may apply a forward torque 428 to the pedals 416, which is transmitted through the chain 418 to the axle 420. The drivetrain 404 rotationally locks the axle 420 and wheel 406 in the locked state. Movement of the wheel 406, conversely, may apply a torque to the axle 420 through the hub 422, moving the pedals 416. For example, when the wheel is moving in the first rotational direction 430, the pedals 416 also move. The user may apply a rearward torque 438 through the pedals 416 to decelerate the wheel 406 (i.e., accelerate the wheel 406 in the second rotational direction 436) without the need for other brakes on the wheel 406 itself.

In some embodiments, the drivetrain may transition between the unlocked state and the locked state during movement of the drivetrain, and in other embodiments, the drivetrain may transition from the unlocked state to the locked state when the drivetrain is stationary. In yet other embodiments, a drivetrain may be configured to transition from the unlocked state to the locked state both during movement and while stationary. In at least one example, a drivetrain may transition between the unlocked state and the locked state while the axle of the drivetrain and the wheel are moving at an equivalent rotational velocity.

Figures 1, 6:
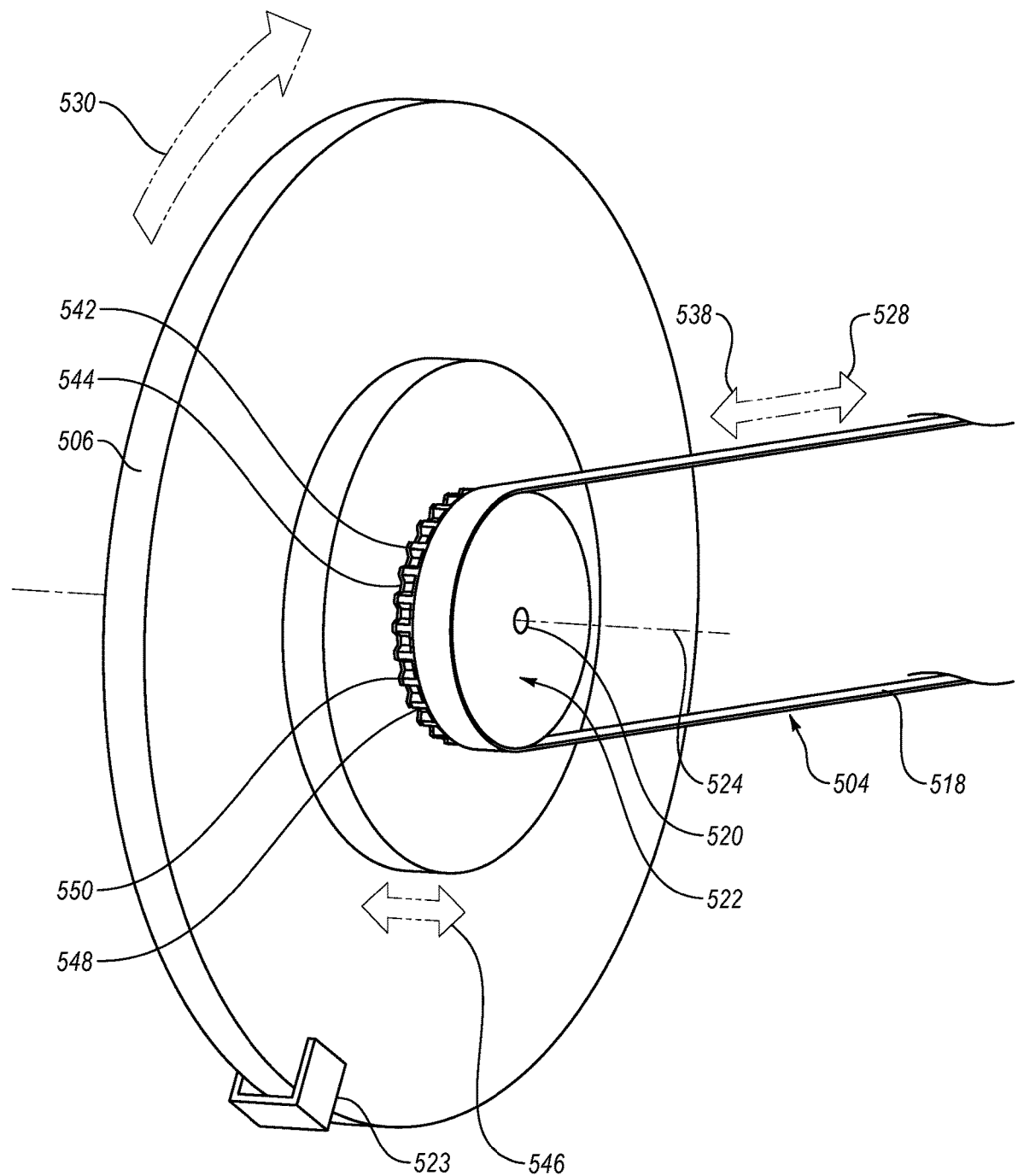
Figures 2, 6:
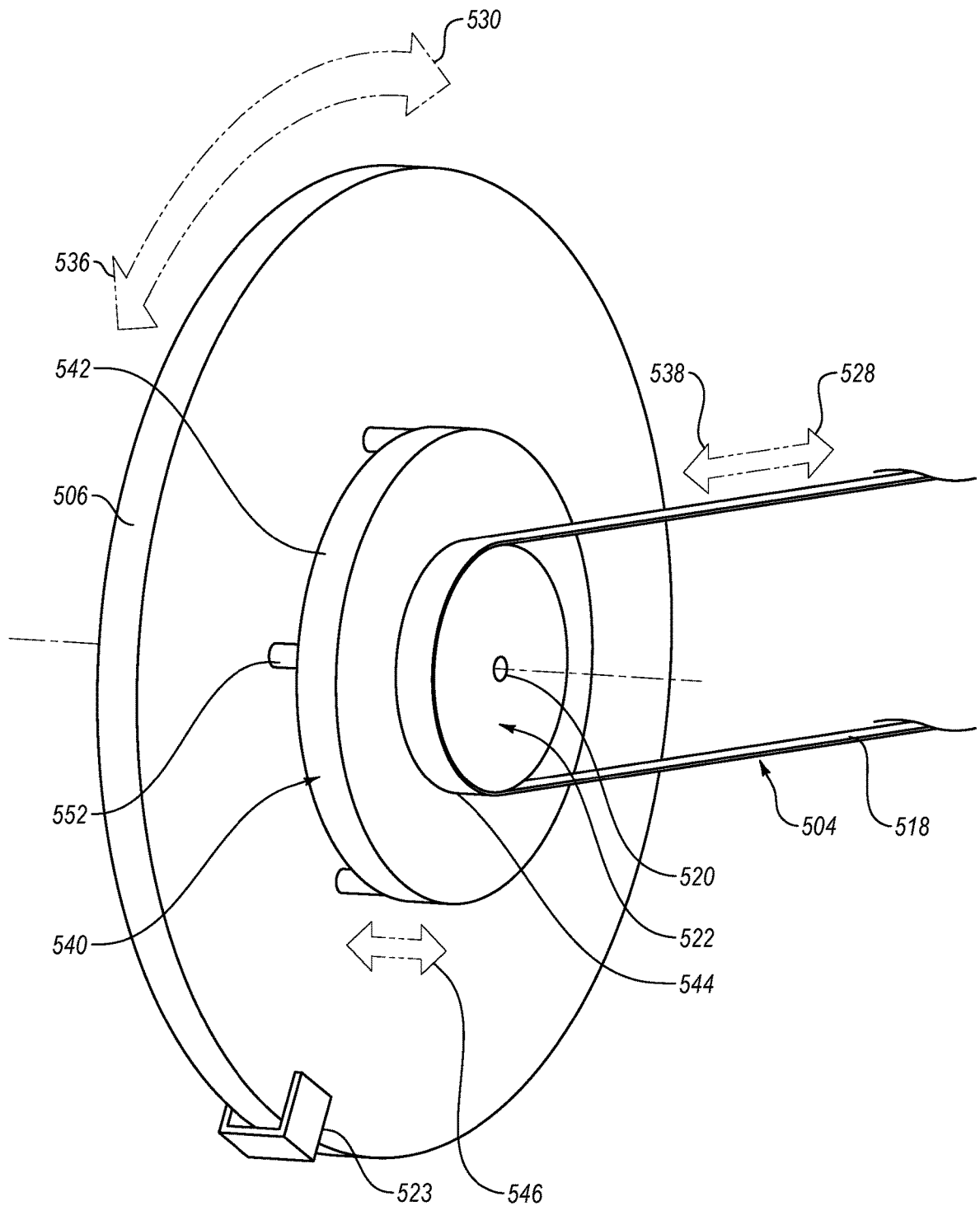

FIG. 6-1 is a perspective view illustrating a drivetrain 504 in an unlocked state. A drivetrain 504 may have a drive mechanism such as the belt 518 depicted in the embodiment of FIG. 6-1. The drive mechanism may rotate an axle 520 and/or hub 522 about a rotational axis 524 of the axle 520, hub 522, and wheel 506. The hub 522 may transmit forward torque 528 to the wheel 506 and accelerate the wheel 506 in a forward first rotational direction 530. In the unlocked state, the hub 522 may behave similarly to a conventional freewheel hub, allowing input of rearward torque 538 from the drive mechanism to be not transmitted to the wheel 506, thereby allowing the wheel 506 to rotate freely in the first rotational direction 530.

In some embodiments, the drivetrain 504 may include a locking mechanism 540. The locking mechanism 540 may be movable between an unlocked state (illustrated in FIG. 6-1) and a locked state (illustrated in FIG. 6-2), as described herein. In some embodiments, the locking mechanism 540 may have at least one wheel member 542 that is movable to engage with a drive member 544. For example, the wheel member 542 may be movable in an axial direction 546 along the rotational axis 524 of the axle 520, hub 522, and wheel 506. In other examples, the wheel member 542 may be movable in a radial direction or other direction perpendicular to the rotational axis 524. In some embodiments, the locking mechanism 540 may be movable only when the safety brake 523 is engaged.

In some embodiments, the drive member 544 may be rotationally fixed relative to the drive mechanism (e.g., the belt 518) and/or the axle 520, such that the drive member 544 rotates at the same rotational velocity as the axle 520. The wheel member 542 may be rotationally fixed relative to the wheel 506, such that the wheel member 542 rotates at the same rotational velocity as the wheel 506. While in the illustrated embodiment of FIGS. 6-1 and 6-2 the wheel member 542 is movable relative to the wheel 506 and to the drive member 544, in other embodiments, the drive member 544 may be movable relative to the wheel 506 and/or wheel member 542 instead of or in addition to the wheel member 542.

In other embodiments, the wheel member 542 and/or drive member 544 may include a unidirectional bearing. The freewheel hub 522 may transmit torque in a first rotational direction 530. In a locked state, the unidirectional bearing may transmit torque through the locking mechanism 540 in a second rotational direction. In the locked state, therefore, the freewheel hub 522 and unidirectional bearing of the locking mechanism 540 may work in concert to rotationally fix the wheel 506 to the drivetrain 504.

The drive member 544 may be selectively coupled to the wheel member 542 to transfer torque from the drive member 544 to the wheel member 542, and for the wheel member 542 to transfer torque to the drive member 544. Engaging the wheel member 542 and drive member 544 may allow a user greater control over the movement of the wheel 506 and/or may enhance a user's exercise experience.

In some embodiments, the wheel member 542 and the drive member 544 may engage by one or more interlocking mechanical features. For example, the embodiment illustrated in FIG. 6-1 and FIG. 6-2 depicts the engagement of a drive member 544 having a plurality of radially oriented (relative to the rotational axis 524) interlocking features 548 with a wheel member 542 having a plurality of complementary interlocking features 550. In other embodiments, the wheel member 542 and drive member 544 may have axially oriented interlocking features. In yet other embodiments, the wheel member 542 and drive member 544 may engage through other non-mechanical engagement mechanisms, such as a friction clutch plate that uses contact friction between the wheel member 542 and drive member 544, magnetic engagement between the wheel member 542 and drive member 544, viscous drag engagement between the wheel member 542 and drive member 544 (e.g., surface engagement with a layer of fluid therebetween), or combinations thereof.

FIG. 6-2 is a perspective view of the drivetrain 504 and wheel 506 of FIG. 6-1 in a locked state. In some embodiments, the wheel member 542 may move in the axial direction toward the drive member 544, engaging the wheel member 542 and the drive member 544. In the locked state, the wheel member 542 and drive member 544 may be rotationally fixed relative to one another such that the hub 522 is bypassed and torque is transmitted from the drive mechanism (i.e., the belt 518) and/or axle 520 directly to the wheel 506.

As the hub 522 is bypassed in the locked state, in the embodiment illustrated in FIG. 6-2, the locking mechanism 540 may transmit forward torque 528 from the belt 518 and/or axle 520 to the wheel 506 to accelerate the wheel 506 in the first rotational direction 530, and the locking mechanism 540 may transmit rearward torque 538 from the belt 518 and/or axle 520 to the wheel 506 to accelerate the wheel 506 in the second rotational direction 536.

In some embodiments, the wheel member 542 of the locking mechanism 540 may be rotationally fixed to the wheel 506 and axially movable relative to the wheel 506 one or more posts 552. In other embodiments, the wheel member 542 may be movable relative to the wheel 506 in the axial direction 546 along another mechanism and may transfer torque to the wheel 506 through one or more splines, frictional engagement, magnetic engagement, viscous engagement, or combinations thereof.

Figure 7:
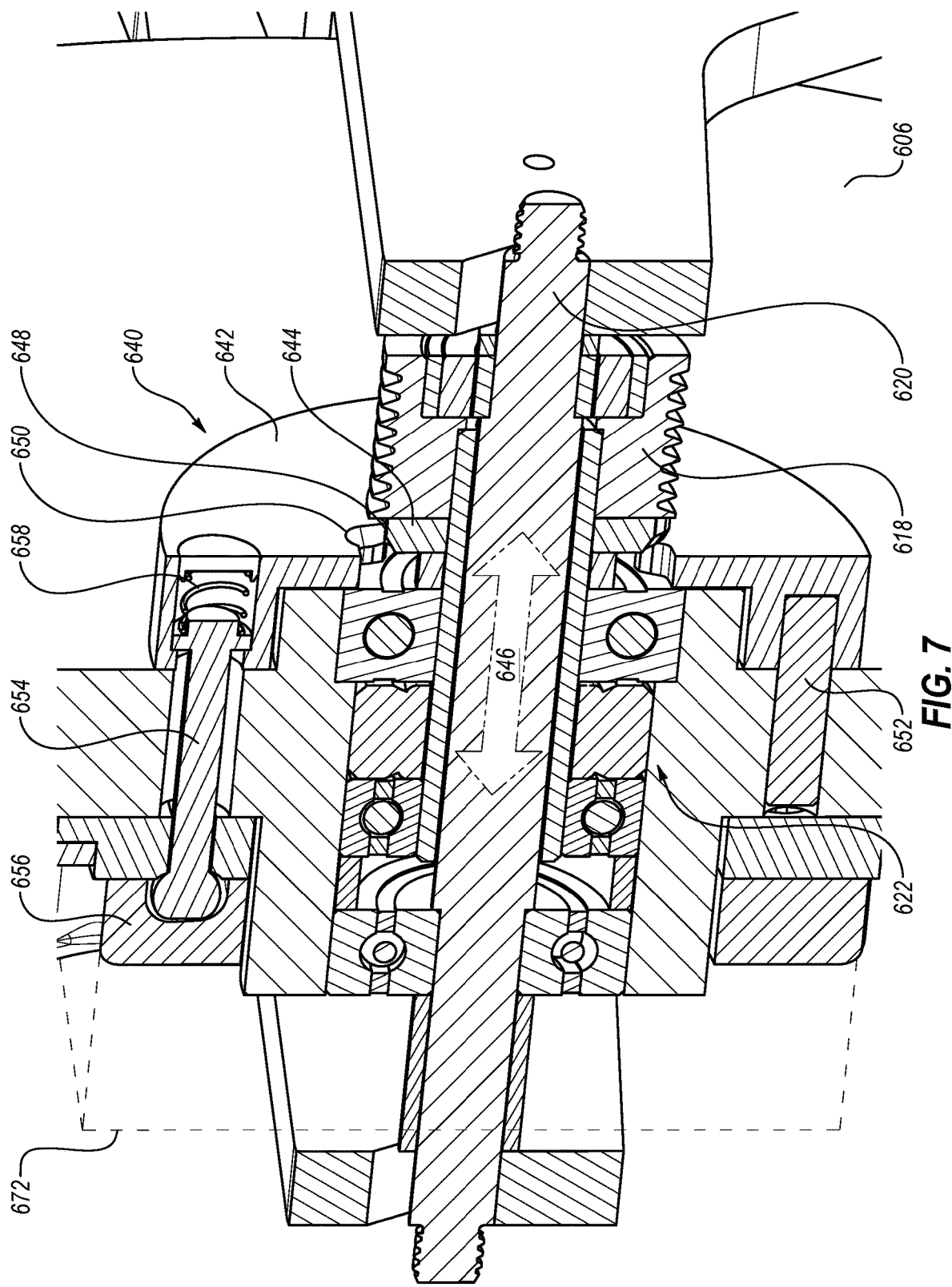
FIG. 7 is an axial cross-sectional view of the embodiment of a locking mechanism of FIG. 6-1.

FIG. 7 is an axial cross-sectional view of an embodiment of a locking mechanism 640, according to the present disclosure. The locking mechanism 640 may selectively engage in a locked state to bypass a hub 622 and transmit torque directly from a drive mechanism 618 to a wheel 606. In some embodiments, the locking mechanism 640 is moved between the unlocked state (depicted in FIG. 7) and a locked state by mechanically moving a portion of the locking mechanism 640 in an axial direction 646 (i.e., in the direction of the axle 620). The movable portion of the locking mechanism 640 may be movable along a post 652 or other support member. For example, the wheel member 642 of the locking mechanism 640 may be supported by a plurality of posts 652 rotationally fixing the wheel member 642 to the wheel 606.

In some embodiments, the wheel member 642 may be movable by a pushrod 654 that may apply an axial force to move the wheel member 642 in the axial direction 646. The axial position of the pushrod 654 may be selected by the user. In other embodiments, the axial position of the pushrod 654 may be selected by an electric motor in data communication with a computing device, such as a computing device described in relation to FIG. 1 through FIG. 3. A computing device may selectively move the locking mechanism between the locked state and the unlocked state based upon a predetermined exercise plan or based upon information from one or more sensors in communication with the computing device.

In some embodiments, the axial position of the pushrod 654 may be at least partially controlled by a handle 656. The handle 656 may allow the user to manually adjust the position of the pushrod 654 relative to the wheel 606 and/or drive member 644. For example, the handle 656 may be movable in the axial direction 646 to urge the pushrod 654 in the axial direction 646. In other examples, the handle 656 may be rotatable with a sloped surface to urge the pushrod 654 in the axial direction 646.

The handle 656 may urge the pushrod 654 axially relative to the wheel member 642. In some embodiments, the wheel member 642 and drive member 644 may engage via interlocking features 648 on the drive member 644 and complementary interlocking features 650 on the wheel member 642. In some instances, the interlocking features 648 and complementary interlocking features 650 may be misaligned. In such instances, urging the wheel member 642 toward the drive member 644 may grind or damage the interlocking features 648 and complementary interlocking features 650. In other embodiments, the locking mechanism 640 may include a motor 672 that urges the pushrod 654 and/or wheel member 642 in the axial direction 646. For example, the locking mechanism 640 may include an electric motor, a pneumatic piston-and-cylinder, a hydraulic piston-and-cylinder, a linear magnet, or other actuator to urge the wheel member 642 and drive member 644 toward one another. In other examples, the motor 672 may apply a torque to the handle 656 to rotate the handle 656 and urge the pushrod 654 and/or wheel member 642 in the axial direction 646.

In some embodiments, a biasing element 658 may be positioned between the pushrod 654 and the wheel member 642. For example, the biasing element 658 may apply a force to the wheel member 642 based upon the axial position of the pushrod 654 (e.g., based upon Hooke's Law). In some examples, the biasing element 658 may be a coil spring, such as illustrated in FIG. 7. In other examples, the biasing element 658 may be a wave spring, a leaf spring, a compressible bushing, a compressible fluid, one or more magnets, or combinations thereof. The biasing element 658 may urge the wheel member 642 and drive member 644 toward one another until the interlocking features 648 on the drive member 644 and complementary interlocking features 650 of the wheel member 642 align, at which point, the wheel member 642 and drive member 644 may move toward one another and the interlocking features 648 and complementary interlocking features 650 may engage such that the locking mechanism 640 is in the locked state.

Figure 8:
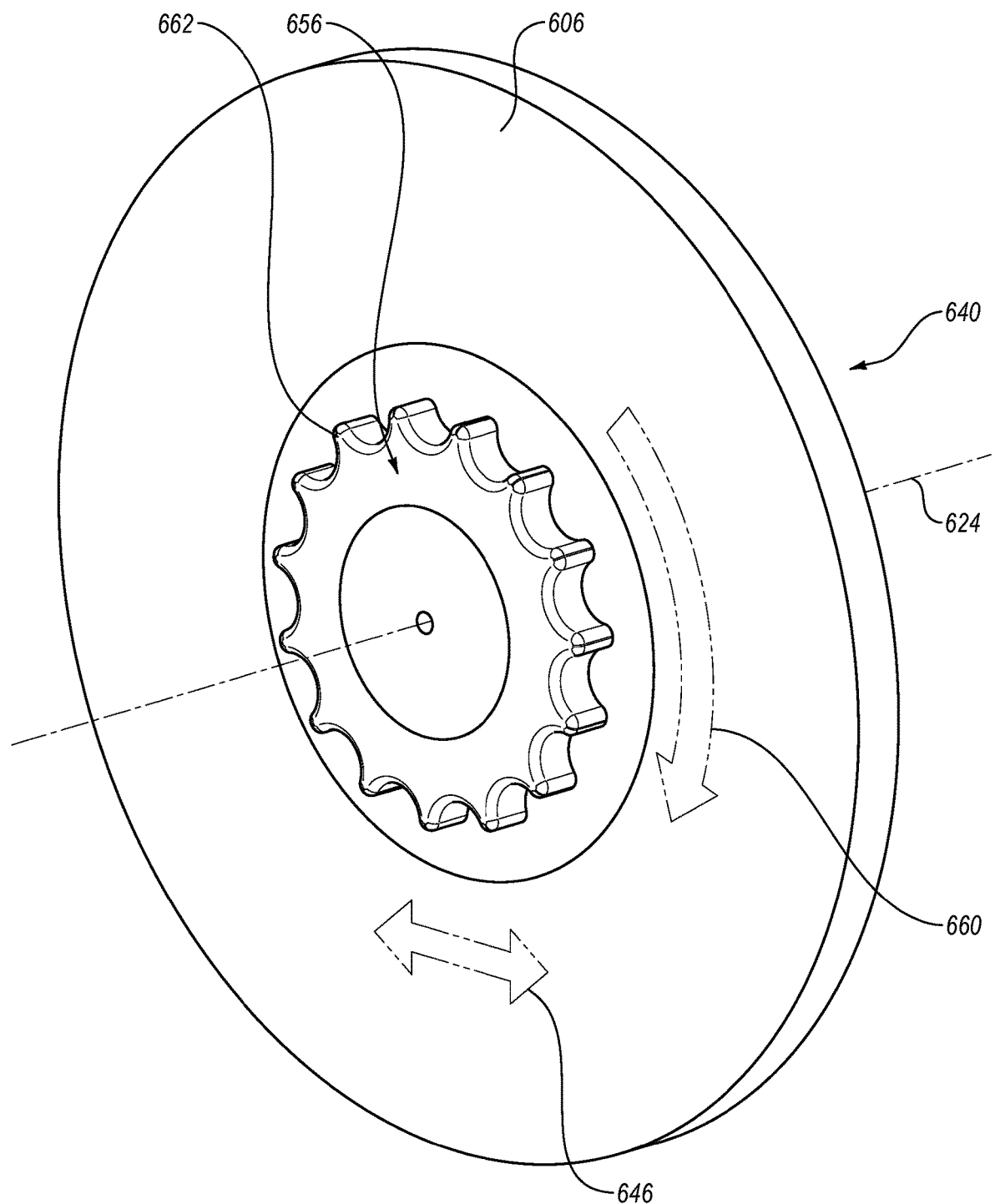
FIG. 8 is a left perspective view of the embodiment of a locking mechanism of FIG. 6-1.

FIG. 8 is a perspective view of the embodiment of a wheel 606 and handle 656 of FIG. 7. In some embodiments, the handle 656 may be rotatable about the rotational axis 624. For example, rotating the handle 656 in a locking direction 660 about the rotational axis 624 may move at least a portion of the locking mechanism in the axial direction 646, moving the locking mechanism 640 to the locked state.

In some embodiments, the handle 656 may have one or more surface features 662 to increase or improve a user's grip or tactile feedback with the handle 656. For example, the surface features may include a textured surface, a rubberized surface, protrusions, recesses, or other features that may allow a user to identify and operate the handle more easily without visual confirmation.

Figure 9:
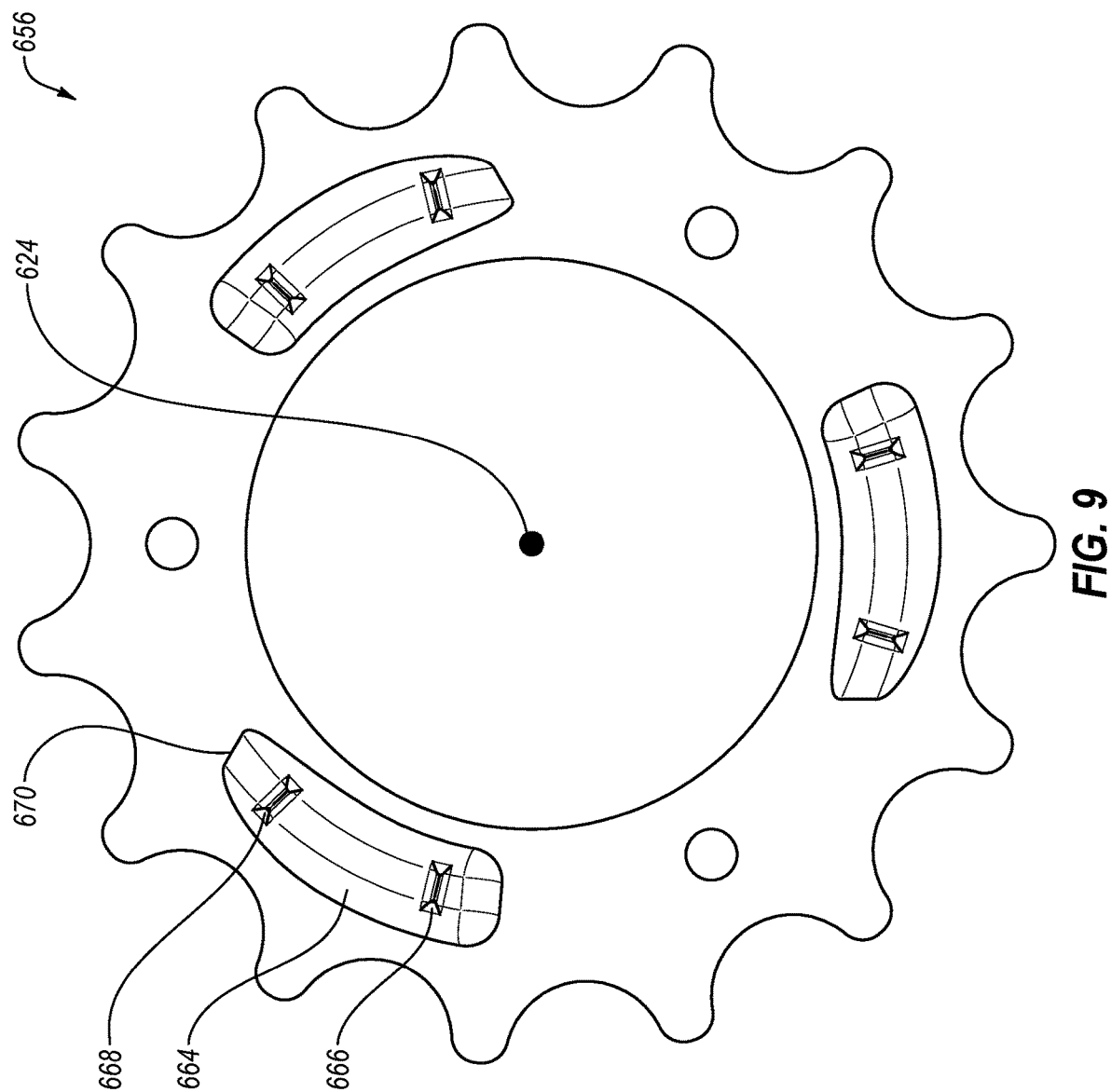
FIG. 9 is an inside view of a rotatable handle of a locking mechanism, according to at least one embodiment of the present disclosure.

FIG. 9 is a side view of the handle 656 of FIG. 8 illustrating the side facing the wheel and locking mechanism. In some embodiments, a handle 656 may have one or more sloped surfaces 664 at least partially recessed therein. The sloped surface 664 may have a deep end 666 and a shallow end 668. The rotating the handle 656 about the rotational axis 624 may cause the sloped surface 664 to move relative to an end of a pushrod (such as pushrod 654 described in relation to FIG. 7) and urge the pushrod axially (i.e., perpendicularly to the rotation of the handle 656) as the sloped surface 664 moves past the pushrod.

In some embodiments, the handle 656 may be bistable. For example, a bistable handle 656 may have two positions in which the handle 656 is stable. The embodiment of a handle 656 illustrated in FIG. 7 through 9 is stable at either end of the sloped surface 664. In some embodiments, a biasing element in a locking mechanism may bias a pushrod toward the handle 656 and/or toward the sloped surface 664. The pushrod may press against the sloped surface 664 under force from the biasing element. The contact of the pushrod against the sloped surface 664 may rotate the handle 656 about the rotational axis 624 until the pushrod is resting in the deep end 666 of the sloped surface 664. The deep end 666 may, therefore, be a first stable position of the handle 656.

In some embodiments, the shallow end 668 of the sloped surface 664 may have a recess or depression 670 therein, such that the pushrod may rest in the recess or depression 670, creating a second stable position of the handle 656. When located in any position between the first stable position and the second stable position, the contact from the pushrod may bias the handle 656 toward the first stable position. In the embodiment of a locking mechanism and handle 656 of FIG. 7 through FIG. 9, the first stable position may be an unlocked state of the locking mechanism and the second stable position may be a locked state of the locking mechanism. The locking mechanism may, therefore, be biased toward the unlocked state of the locking mechanism when between positions. In other embodiments of a locking mechanism, the locking mechanism may be biased toward a locked state of the locking mechanism when between positions.

In other embodiments, the sloped surface may be continuous and undulating about the rotational axis 624 of the handle 656. In such embodiments, the handle 656 may rotate through indexed stable positions that alternate between a locked state and an unlocked state. For example, continuous rotation of the handle 656 in a first direction may cycle the locking mechanism between a locked state and an unlocked state.

Figure 10:
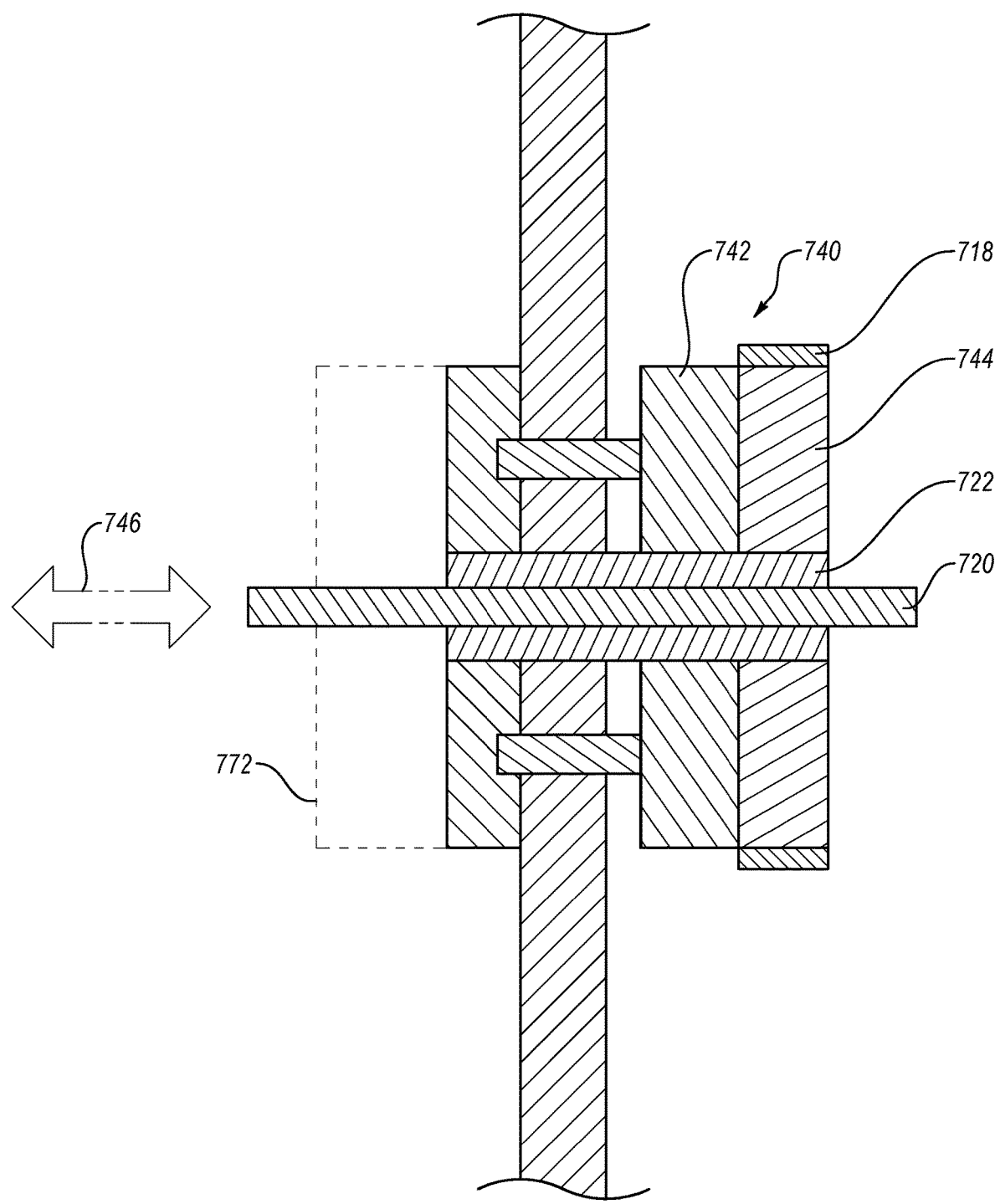
FIG. 10 is a side cross-sectional view of a locking mechanism with a friction clutch, according to at least one embodiment of the present disclosure.

While FIG. 6-1 through 9 illustrate an embodiment of a locking mechanism with radial interlocking mechanical features to move the locking mechanism between a locked state and an unlocked state through axial movement, other locking mechanisms may use other engagement methods. For example, embodiments of locking mechanisms may transmit torque in a locked state using interlocking mechanical features oriented in the axial direction, friction forces oriented in the axial direction, friction forces oriented in the radial direction, magnetic forces, viscous drag forces, other engagement forces, or combinations thereof. FIG. 10 illustrates another embodiment of a locking mechanism 740 for use in pedaled cycling systems.

The locking mechanism 740 may have a wheel member 742 and a drive member 744. In some embodiments, the drive member 744 may be driven by a drive mechanism 718 directly. In other embodiments, the drive mechanism 718 may drive at least part of an axle 720 and/or hub 722 to which the drive member 744 is rotationally fixed. The wheel member 742 may be movable in an axial direction 746 toward or away from the drive member 744. In some embodiments, the wheel member 742 and drive member 744 may be movable relative to one another by manual manipulation by a user (such as the handle 656 described in relation to FIG. 7 through FIG. 9) or by a motor 772.

In some embodiments, a surface of the wheel member 742 may contact a surface of the drive member 744. The friction between the wheel member 742 and drive member 744 may be sufficient such that torque applied to the drive member 744 by the drive mechanism 718 may be transferred fully to the wheel member 742 (e.g., without slippage between the wheel member 742 and drive member 744) during usage. In some embodiments, the surfaces of the wheel member 742 and drive member 744 in contact with one another may be substantially flat, with little or no surface relief or other interlocking features. For example, the wheel member 742 and drive member 744 may transmit torque therebetween similar to a friction clutch plate system. In other embodiments, the wheel member 742 and drive member 744 may have one or more surface features having a height in the axial direction 746 to increase friction and/or improve torque transmission between the wheel member 742 and drive member 744.

Figure 11:
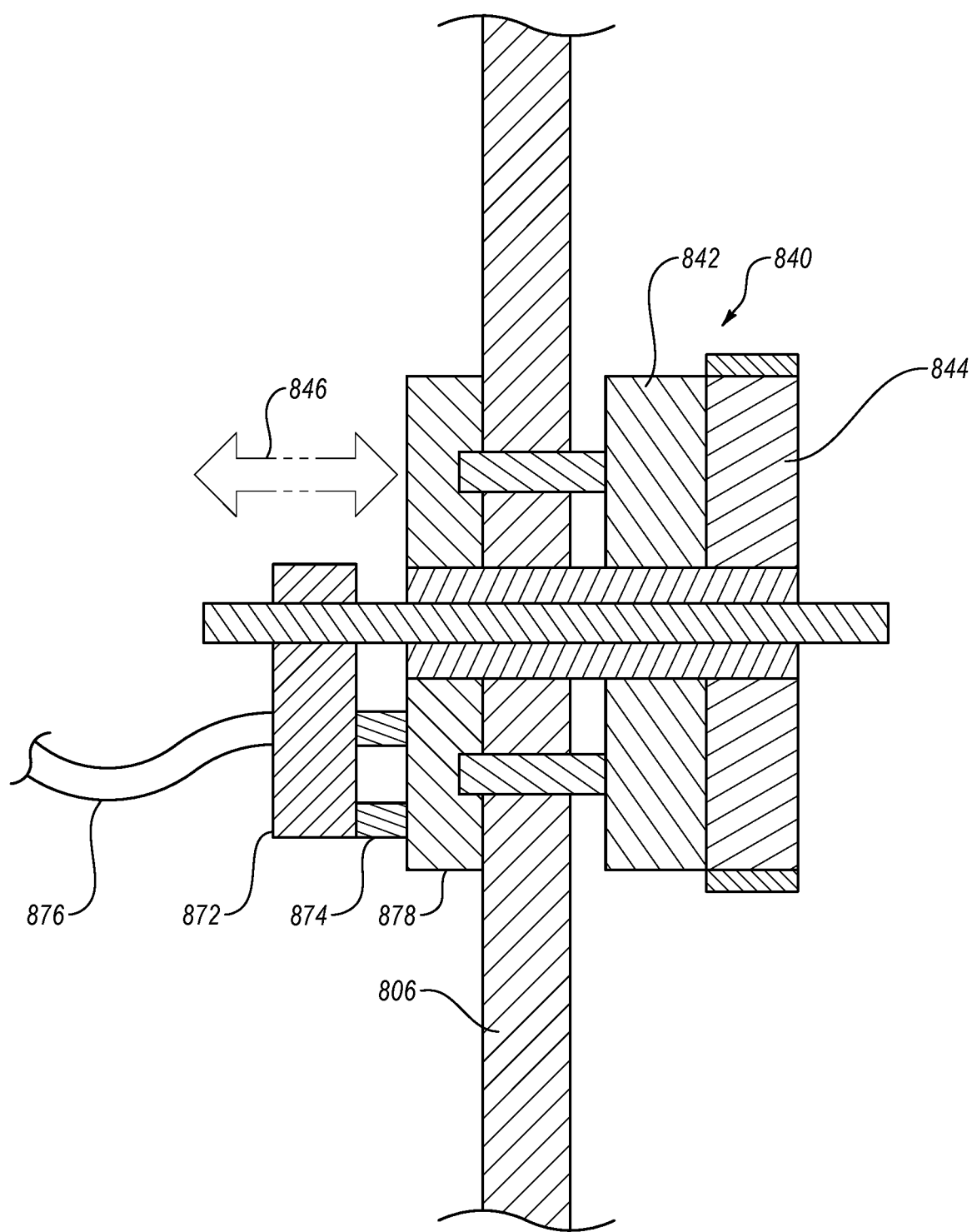
FIG. 11 is a side cross-sectional view of an electrically actuated locking mechanism, according to at least one embodiment of the present disclosure.

The frictional force between the wheel member 742 and drive member 744 is at least partially related to the contact force between the wheel member 742 and drive member 744 in the axial direction 746. In some embodiments, the contact force may be provided by a rotatable handle such as described in relation to FIG. 7 through FIG. 9. FIG. 11 is a side cross-sectional view of an embodiment of a locking mechanism 840 with an electric motor 872 that moves the locking mechanism between the locked state and the unlocked state. In some embodiments, the electric motor 872 may move one or more extensions 874 in the axial direction 846. The electric motor 872 may be in communication with one or more controllers (such as controller 326 described in relation to FIG. 3) and/or computing devices (such as computing device 114 described in relation to FIG. 1) via a communication cable 876. In some embodiments, the electric motor 872 may be in data communication via a wireless communication with one or more controllers and/or computing devices. In some embodiments, the electric motor 872 may be in data communication with one or more sensors that allow for feedback to the user and/or a computing device. The electric motor 872 may, therefore, operate as a lockout device of the locking mechanism 840. The electric motor 872 may be controlled by a computing device that is also in communication with one or more sensors. The state of the locking mechanism 840 may, therefore, be only changeable when the computing device receives information from the sensors that confirm the wheel 806 is stationary or below a threshold rotational velocity, or when the sensors confirm the user is not applying a torque to the drive member 844. For example, the computing device may send a command to the electric motor 872 to actuate the locking mechanism 840 when both the drive member 844 and the wheel member 842 are stationary. In other examples, the computing device may send a command to the electric motor 872 to actuate the locking mechanism 840 when both the drive member 844 and the wheel member 842 have equal rotational velocities.

The extensions 874 may contact or be connected to the wheel member 842. For example, the extensions 874 may be uncoupled from the wheel member 842, allowing the wheel member 842 to rotate with the wheel 806 during use. The extensions 874 may apply a force in the axial direction 846 while sliding on an outer surface 878 of the wheel member 842 as the wheel 806 and wheel member 842 continue to rotate. The electric motor 872 and extensions 874 may apply an axial force to the wheel member 842 without impairing the rotation of the wheel 806 or otherwise interrupting the use of the wheel 806. In some embodiments, the extensions 874 may slide along the outer surface 878 of the wheel member 842. In other embodiments, the extension 874 may include one or more bearings that contact outer surface 878 of the wheel member 842. In yet other embodiments, the outer surface 878 of the wheel member 842 may include one or more movable rings that may receive an axial force from the extensions 874 and transmit little or no torque from the contact with the extensions 874 to the remainder of the wheel member 842 and/or wheel 806.

Figure 12:
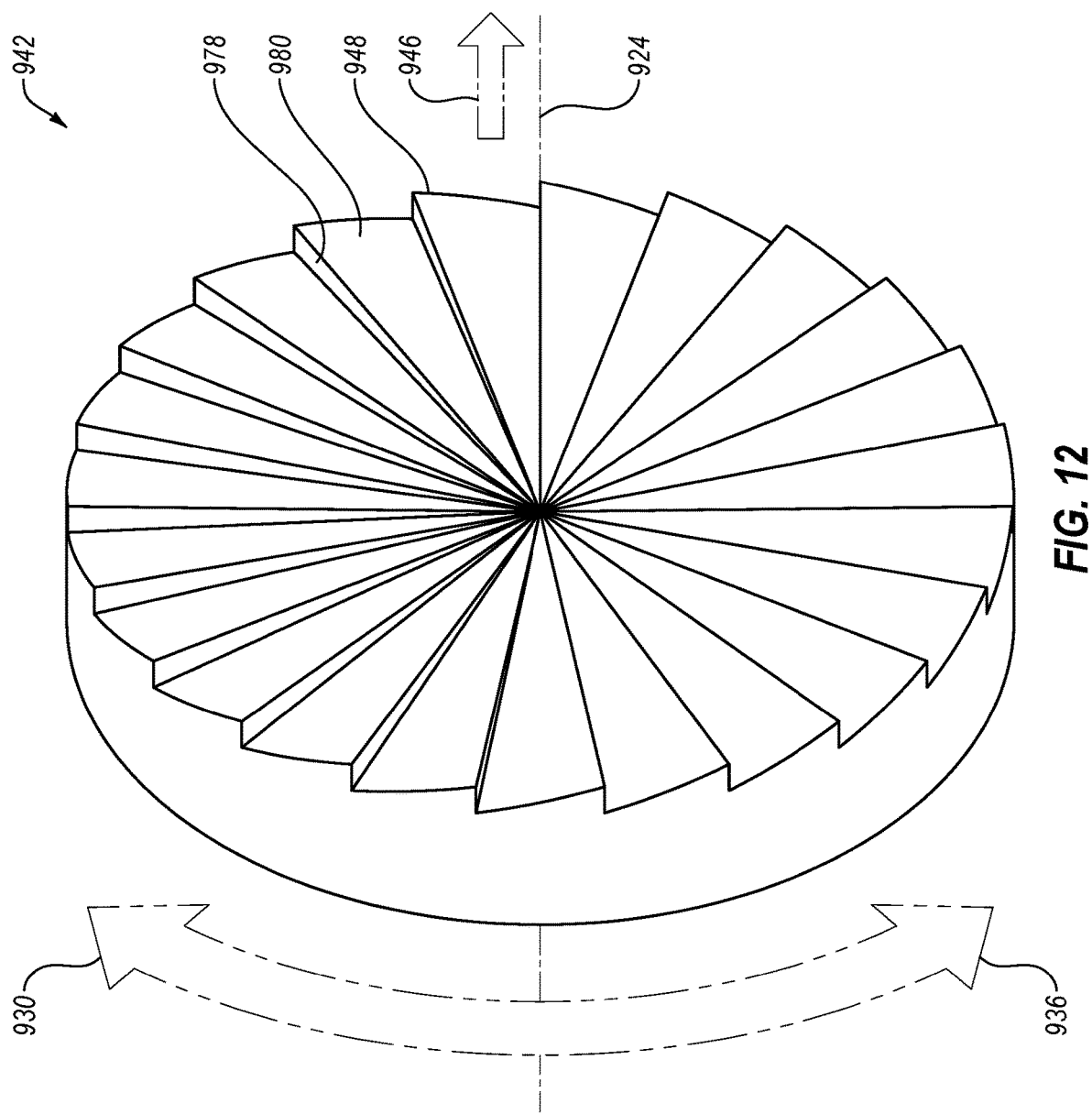
FIG. 12 is a perspective view of a wheel member of a locking mechanism with axially oriented interlocking features, according to at least one embodiment of the present disclosure.

In some embodiments, a wheel member and/or drive member may have one or more surface features that reduce the axial force necessary to transmit torque between the wheel member and drive member in the locked state. FIG. 12 is a perspective view of an embodiment of a wheel member 942 that includes an interlocking mechanical feature 948 oriented in the axial direction 946. In some embodiments, the interlocking mechanical features may be symmetrical about a rotational axis 924 (e.g., have the same profile in a first rotational direction and in a second rotational direction). For example, a conventional gear may have a plurality of teeth with a symmetrical profile in either rotational direction.

The embodiment of a face gear illustrated in FIG. 12 has a plurality of surface features with an asymmetric profile. The interlocking mechanical features 948 may engage more aggressively in a second rotational direction 936 than a first rotational direction 930. For example, a rearward face 978 of the interlocking mechanical feature 948 may have a steeper angle relative to the second rotational direction 936 than a forward face 980 relative to the first rotational direction 930. An asymmetric profile of the interlocking mechanical features 948 may allow the locking mechanism to "slip" in the first rotational direction 930 while engaging more aggressively in the second rotational direction as the rearward faces 978 compressively engage in a locked state in the second rotational direction 936. In the first rotational direction, a drivetrain according to the present disclosure may rely upon a freewheel hub to transmit an input torque, therefore, a less aggressive profile in the first rotational direction may reduce the risk of damage to the locking mechanism without impairing the transmission of torque to the wheel in the first rotational direction.

Figure 13:
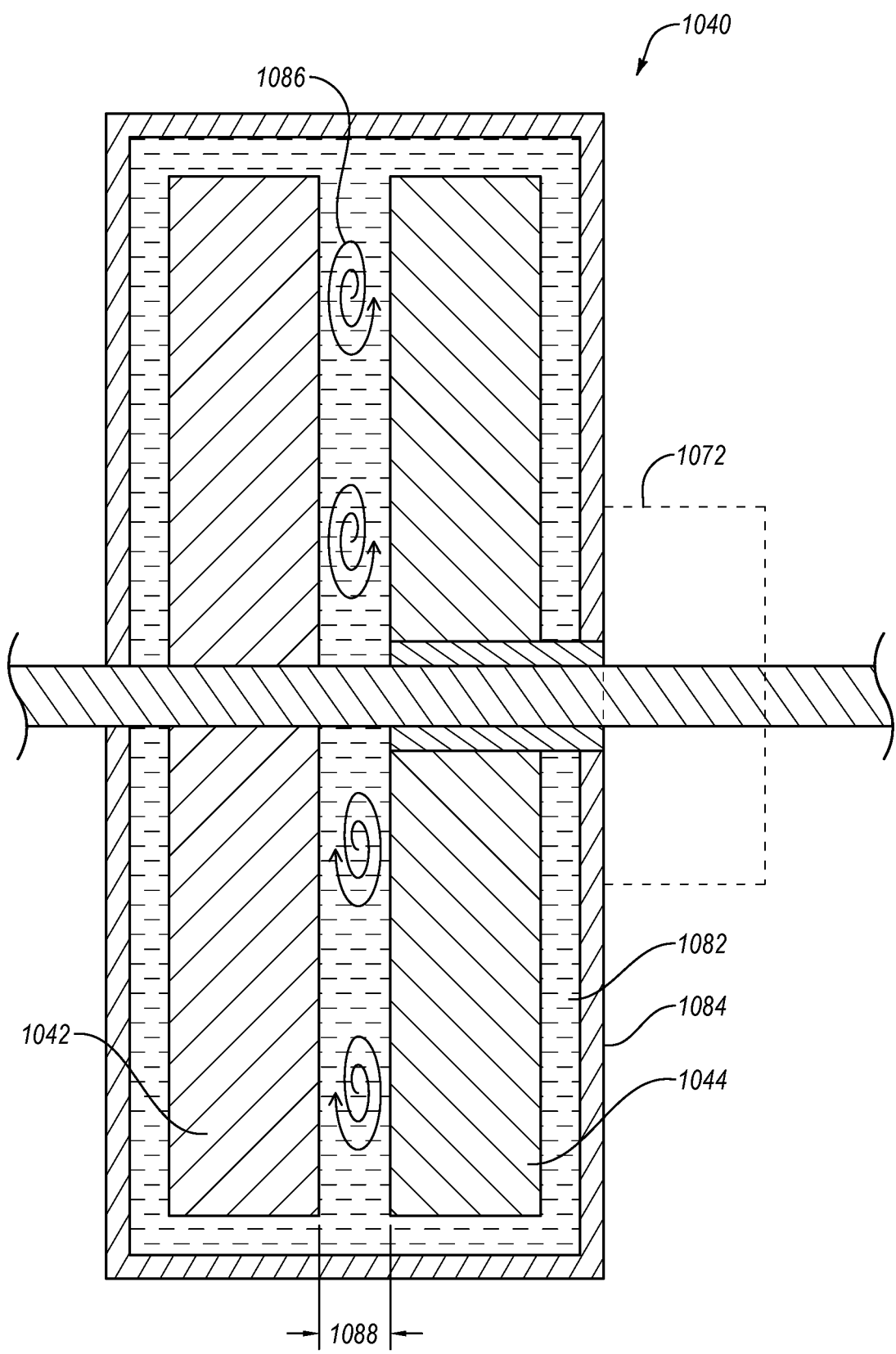
FIG. 13 is a side cross-section schematic representation of a locking mechanism including a fluid positioned therein, according to at least one embodiment of the present disclosure.

As described herein, a locking mechanism may have a locked state and an unlocked state. In some embodiments, a locking mechanism may further have an intermediate state. An intermediate state may transmit some torque between a wheel member and a drive member without rotationally fixing the drive member and the wheel member. For example, FIG. 13 illustrates an embodiment of a locking mechanism 1040 including a wheel member 1042 and a drive member 1044 with a fluid 1082 positioned therebetween. The fluid 1082 may be positioned in a housing 1084.

In some embodiments, the fluid 1082 may be a compressible fluid. In other embodiments, the fluid 1084 may be an incompressible fluid. The fluid 1082 may have a viscosity that produced a drag force 1086 between the wheel member 1042 and the drive member 1044. In some embodiments, the drag force 1086 may increase with a greater rotational velocity differential between the wheel member 1042 and the drive member 1044. In other embodiments, the drag force 1086 may increase as a spacing 1088 between the wheel member 1042 and the drive member 1044 decreases. In some embodiments, the spacing 1088 of the wheel member 1042 and drive member 1044 may be changeable by manual manipulation by a user (such as the handle 656 described in relation to FIG. 7 through FIG. 9) or by a motor 1072.

For example, the locking mechanism 1040 may have an unlocked state with the wheel member 1042 and the drive member 1044 at a spacing sufficient to transmit less than 5% of the torque therebetween, a locked state in which the wheel member 1042 and the drive member 1044 contact one another and are rotationally fixed to one another by friction forces and/or a mechanical interlock, and an intermediate state in which the fluid drag forces 1086 transmit greater than 5% of a torque between the wheel member 1042 and the drive member 1044 and the wheel member 1042 and the drive member 1044 are not rotationally fixed relative to one another. An intermediate state may be beneficial to allow the wheel member 1042 and the drive member 1044 to approach or match rotational velocities when transitioning between a locked state and an unlocked state during usage.

In some embodiments, the fluid 1082 may have a variable viscosity. For example, the fluid 1082 may be a magneto-rheological fluid that changes effective viscosity with the application of a magnetic field to the fluid. In some embodiments, the fluid 1082 may have a variable viscosity with a range sufficient such that a low end of the viscosity range (i.e., a low viscosity regime with no magnetic field applied) transmits less than 5% of the torque between the drivetrain and the wheel and a high end of the viscosity range (i.e., high viscosity regime with a magnetic field applied) rotationally fixes the drivetrain and wheel in a locked state. In other words, a variable viscosity fluid may allow for a locking mechanism with a fixed spacing 1088 between the wheel member 1042 and the drive member 1044.

In some embodiments, a locking mechanism may include a wheel member and/or a drive member that is movable in a radial direction relative to a rotational axis of the wheel. For example, a pedaled drivetrain may have spatial limitations in the axial direction, and axial movement of a portion of the locking mechanism may be undesirable. In at least one example, increasing a width of a wheel, a hub, a cassette, or other portion of the drivetrain in an axial direction may require altering a frame of an existing bicycle or other device. It may be beneficial, therefore to move one or more components in a radial direction to accommodate different form factors and/or housing dimensions.

Figure 14:
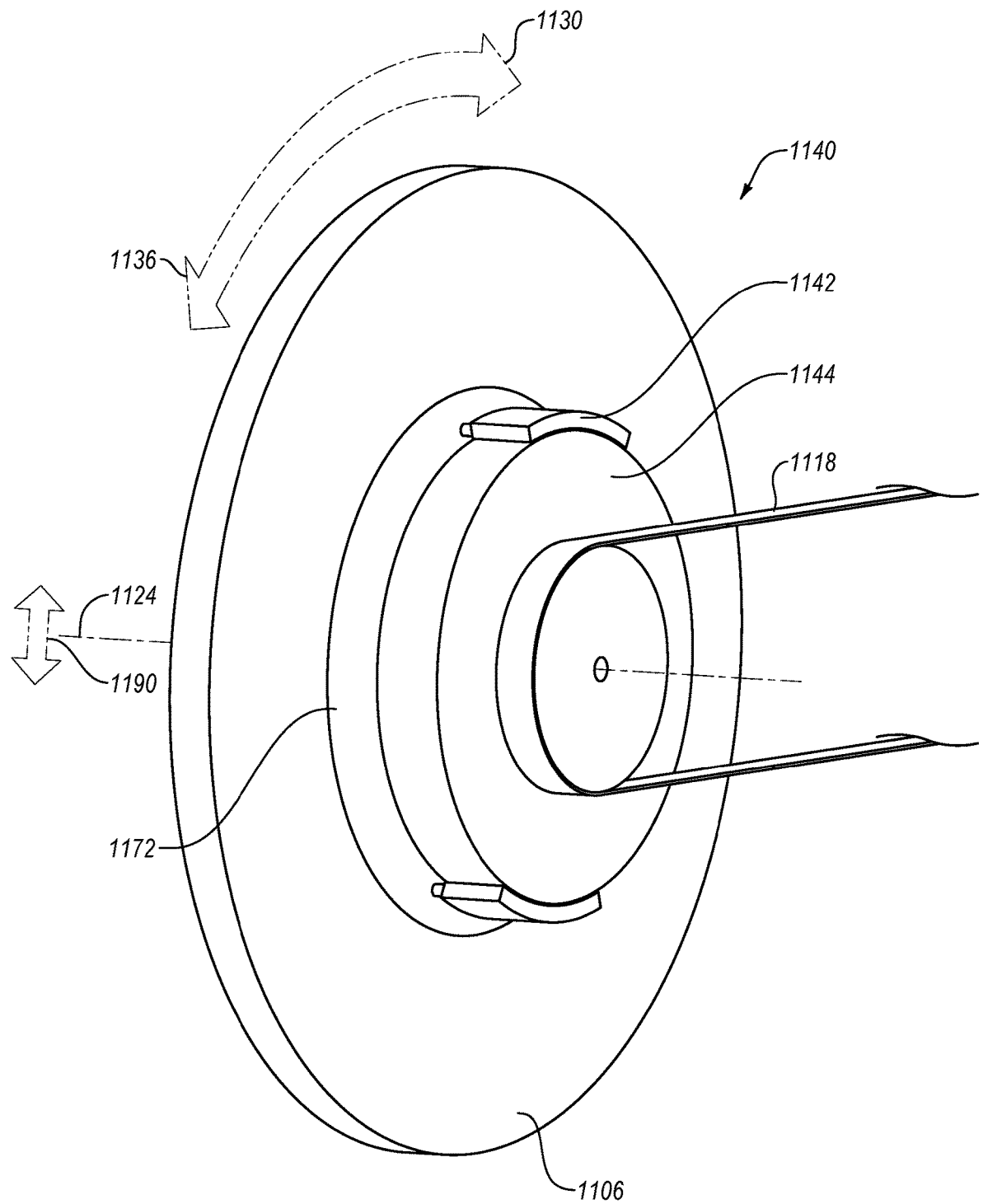
FIG. 14 is a perspective view of a locking mechanism with radially movable components, according to at least one embodiment of the present disclosure.

FIG. 14 is a perspective view of another embodiment of a locking mechanism 1140 configured to selectively rotationally fix a drive mechanism 1118 and a wheel 1106. In some embodiments, a locking mechanism 1140 may have a wheel member 1142 and a drive member 1144 that are positioned with at least part of one of the wheel member 1142 and drive member 1144 radially outside the other. For example, at least a portion of a wheel member 1142 may be positioned axially overlapping a portion of the drive member 1144 with respect to the rotational axis 1124 and further from the rotational axis 1124 in a radial direction 1190 perpendicular to the rotational axis 1124. The portion of the wheel member 1142 positioned radially outside the drive member 1144. In other words, at least a portion of the wheel member 1142 may operate similarly to a drum brake (for example, when actuated by a motor 1172) to compress the drive member 1144 and transmit torque therebetween in both a first rotational direction 1130 and a second rotational direction 1136.

Figure 15:
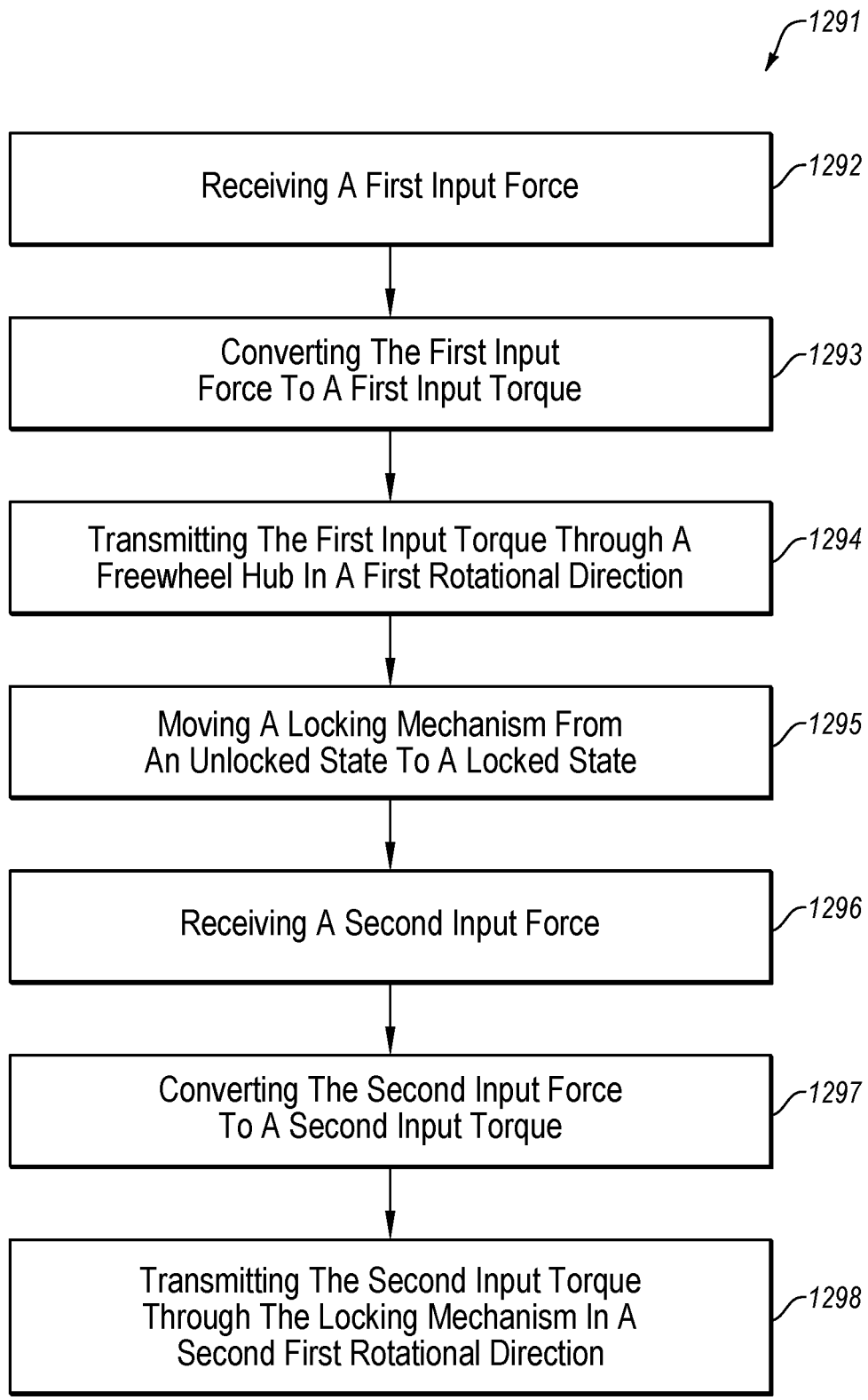
FIG. 15 is a flowchart illustrating a method of selectively rotationally fixing a pedaled drivetrain and a wheel, according to at least one embodiment of the present disclosure.

FIG. 15 is a flowchart illustrating an embodiment of a method 1291 of selectively rotationally fixing a pedaled drivetrain. The method 1291 may include receiving a first input force from a user at 1292. In some embodiments, the first input force may be received by foot pedals, such as platform pedals, clip pedals, clipless pedals, or other pedals configured to receive force applied by a user's foot in a cyclic motion. In other embodiments, the first input force may be received by hand pedals, such as rotatable grips, platforms, reciprocating handles, or other hand grips configured to receive force applied by a user's hand in a cyclic motion.

The method 1291 may further include converting the first input force to a first input torque in a first rotational direction at 1293 and transmitting the first input torque through a freewheel hub to a wheel in a first rotational direction of the wheel at 1294. The method 1291 includes moving a locking mechanism from an unlocked state to a locked state to rotationally fix at least a portion of the drivetrain to the wheel at 1295. When the locking mechanism is in the locked state, the method 1291 includes receiving a second input force from a user at 1296 and converting the second input force to a second input torque in a second rotational direction opposite the first rotational direction at 1297. The method 1291 then includes transmitting the second input torque through the locking mechanism in the locked state to the wheel in a second rotational direction of the wheel at 1298.

In some embodiments, the method may include moving the locking mechanism to an intermediate state. The intermediate state of the locking mechanism may transmit between 5% and 95% of a third input torque between the drivetrain and the wheel. For example, the intermediate state may transmit torque while allowing the drivetrain and the wheel to rotate at different rotational velocities. The locking mechanism may remain in the intermediate state until the drivetrain and the wheel have rotational velocities within 5% of one another. When a drivetrain rotational velocity at the locking mechanism and a wheel rotational velocity at the locking mechanism are within 5% of one another, the locking mechanism may move the locked state to rotationally fix the drivetrain and the wheel relative to one another.

INDUSTRIAL APPLICABILITY

In general, the present invention relates to selectively moving a hub in a pedaled drivetrain from an unlocked state to a locked state. The unlocked state may transmit an input torque from the drivetrain to a wheel in a first rotational direction and may transmit little or no torque in a second rotational direction. For example, the unlocked state may transmit substantially all of an input torque (less drivetrain losses and up to a tensile or other yield strength of the components) in the first rotational direction and less than 5% of an input torque in the second rotational direction. In another example, the unlocked state may transmit substantially all of an input torque in the first rotational direction and less than 3% of an input torque in the second rotational direction. In yet another example, the unlocked state may transmit substantially all of an input torque in the first rotational direction and less than 1% of an input torque in the second rotational direction.

The locked state may transmit substantially all of an input torque (less drivetrain losses and up to a tensile or other yield strength of the components) in the first rotational direction and in the second rotational direction. In some embodiments, the locked state may transmit greater than 95% of an input torque in the first rotational direction and in the second rotational direction. In other embodiments, the locked state may transmit greater than 97% of an input torque in the first rotational direction and in the second rotational direction. In yet other embodiments, the locked state may transmit greater than 99% of an input torque in the first rotational direction and in the second rotational direction.

In some embodiments, the locked state may transmit greater than 300 Newton-meters (N-m) of torque from the drivetrain to the wheel in the first rotational direction and second rotational direction without slipping of the drivetrain and wheel relative to one another. In other embodiments, the locked state may transmit greater than 400 N-m of torque from the drivetrain to the wheel in the first rotational direction and second rotational direction without slipping of the drivetrain and wheel relative to one another. In some embodiments, the locked state may transmit greater than 500 N-m of torque from the drivetrain to the wheel in the first rotational direction and second rotational direction without slipping of the drivetrain and wheel relative to one another.

In some embodiments, a pedaled drivetrain with a locked state and an unlocked state may according to the present disclosure may be used in exercise systems or devices, such as stationary bicycles, elliptical trainers, treadmills, cross-country skiing trainers, stationary handcycles, rowing machines, or other exercises systems or devices that include rotational movement of components. In other embodiments, a pedaled drivetrain with a locked state and an unlocked state may according to the present disclosure may be used in transportation and/or recreational devices and systems, such as bicycles (road bicycles, mountain bicycles, recumbent bicycles, handcycles, etc.), pedalboats, microlight aircraft, pedal cars, or other pedal-powered vehicles.

The pedaled drivetrain may be selectively moved between the locked state and unlocked state by actuating a locking mechanism to engage a wheel member and a drive member. The wheel member may be rotationally fixed to the wheel and the drive member may be rotationally fixed to a component of the drivetrain. In the unlocked state, the wheel member and drive member transmit less than 5% of an input torque therebetween in the second rotational direction. In the locked state, the wheel member and drive member may transmit greater than 95% of an input torque in the second rotational direction.

In some embodiments, the wheel member and drive member may selectively engage through the movement of the wheel member and drive member towards one another, and the wheel member and drive member may selectively disengage through the movement of the wheel member and drive member away from one another. For example, moving the locking mechanism between the locked state and the unlocked state may include moving the wheel member relative to the wheel and drivetrain. In other examples, moving the locking mechanism between the locked state and the unlocked state may include moving the drive member relative to the wheel and drivetrain. In other examples, moving the locking mechanism between the locked state and the unlocked state may include moving the both the wheel member and drive member relative to the wheel and drivetrain.

In some embodiments, moving the locking mechanism between the locked state and the unlocked state may include moving the wheel member relative to the wheel and drivetrain in an axial direction of the rotational axis of the wheel. In other examples, moving the locking mechanism between the locked state and the unlocked state may include moving the drive member relative to the wheel and drivetrain in an axial direction of the rotational axis of the wheel. In other examples, moving the locking mechanism between the locked state and the unlocked state may include moving the both the wheel member and drive member relative to the wheel and drivetrain in an axial direction of the rotational axis of the wheel. For example, the engagement of the wheel member and drive member in the axial direction may function similarly to a disc brake.

In other embodiments, moving the locking mechanism between the locked state and the unlocked state may include moving the wheel member relative to the wheel and drivetrain in a radial direction of the rotational axis of the wheel. In other examples, moving the locking mechanism between the locked state and the unlocked state may include moving the drive member relative to the wheel and drivetrain in a radial direction of the rotational axis of the wheel. In other examples, moving the locking mechanism between the locked state and the unlocked state may include moving the both the wheel member and drive member relative to the wheel and drivetrain in a radial direction of the rotational axis of the wheel. For example, the radial movement of the wheel member and the drive member may function similarly to a drum brake.

In some embodiments in the locked state, the wheel member and drive member may directly contact one another. For example, the wheel member and drive member may engage one another and transmit torque therebetween through frictional engagement, mechanical interlocking features (such as radially and/or axially oriented gear teeth), or other surface features such as splines or uneven surfaces. For example, the wheel member and drive member may engage through frictional engagement of the wheel member and drive being compressed against one another.

In some embodiments, the wheel member and drive member may have axially oriented interlocking features and the wheel member and drive member may engage through movement relative to one another in the axial direction (such as face gears). In other embodiments, the wheel member and drive member may have radially oriented interlocking features and the wheel member and drive member may engage through movement relative to one another in the axial direction (such as splines that rotationally interlock and allow axial translation). In yet other embodiments, the wheel member and drive member may have radially oriented interlocking features and the wheel member and drive member may engage through movement relative to one another in the radial direction (such as interlocking radial teeth).

In other embodiments in the locked state, the wheel member and drive member may indirectly engage one another with or without direct contact. For example, the wheel member and drive member may engage one another and transmit torque therebetween through magnetic engagement (permanent magnets and/or electromagnets), fluid drag engagement, or through other forces that do not require contact between the wheel member and drive member.

In some embodiments, a fluid may be positioned between the wheel member and drive member. The drag of the fluid may transmit at least a portion of the torque between the wheel member and drive member when the wheel member and drive member move relative to one another and induce movement of the fluid therebetween. The transmission of torque through the fluid drag may change with a spacing between the wheel member and drive member. For example, more torque may be transmitted through the fluid drag as a spacing between the wheel member and drive member decreases. In other examples, more torque may be transmitted through the fluid drag in a higher viscosity fluid than in a lower viscosity fluid. In at least one example, the fluid may have a variable viscosity, such as a magnetorheological fluid that changes effective viscosity through the application of a magnetic field.

In other embodiments, the wheel member and/or drive member may include one or more magnets. The magnets of the wheel member and/or drive member may produce a magnetic field that may interact with and apply a force between the wheel member and the drive member. For example, the wheel member may include a first magnet and the drive member may include a second magnet. As the wheel member and drive member move closer to one another, a magnetic force between the first magnet and second magnet may increase, enabling the transmission of a greater amount of torque between the wheel member and drive member. In some examples, the first magnet and/or second magnet may be an electromagnetic that may be selectively magnetized. In such examples, a spacing between the wheel member and drive member may be constant and the magnetic force therebetween may be increased or decreased by increasing or decreasing the magnetic field of the electromagnet(s).

In some embodiments, moving the locking mechanism between the locked state and the unlocked state (particularly moving into the locked state) while the wheel member and drive member are rotating with different rotational velocities may break, bent, erode, wear, or otherwise damage the wheel member and/or drive member. For example, the mechanical interlocking features may grind or bend, inhibiting engagement of the wheel and drive members. In other examples, "slipping" of frictional engagement surfaces (such as in a friction clutch) may prematurely wear the frictional engagement surfaces of the wheel member and/or drive member.

In some embodiments, a lockout device may prevent the engagement or movement of the wheel member and/or drive member toward one another when a wheel rotational velocity of the wheel member and a drive rotational velocity of the drive member are different. For example, the lockout device may prevent movement engagement or movement of the wheel member and/or drive member toward one another when a wheel rotational velocity of the wheel member and a drive rotational velocity of the drive member are different by more than 0.1 RPM, 1.0 RPM, 6.0 RPM, 10.0 RPM, 30.0 RPM, 60.0 RPM, or more. In some examples, the lockout device may prevent movement engagement or movement of the wheel member and/or drive member toward one another unless the wheel rotational velocity and the drive rotational velocity are the same. In other examples, the lockout device may prevent movement engagement or movement of the wheel member and/or drive member toward one another unless the wheel rotational velocity and the drive rotational velocity are both 0 RPM (i.e., both are stationary).

In other embodiments, the lockout device may prevent engagement or movement of the wheel member and/or drive member toward one another unless a safety brake is engaged. The safety brake may limit and/or prevent the rotation of the wheel and/or the drivetrain. In at least one embodiment, the locking mechanism may only be movable between the locked state and the unlocked state while the safety brake is engaged.

In yet other embodiments, the locking mechanism may have an intermediate state in which more than 5% and less than 95% of torque is transmitted between the wheel member and the drive member. The intermediate state may allow the wheel member and drive member to "slip" relative to one another to allow the wheel rotational velocity and drive rotational velocity to approach one another. For example, a drive rotational speed may be 0 RPM and the wheel rotational velocity may have a speed of 100 RPM. The locking mechanism may move to the intermediate state to transmit a portion of the torque therebetween, and the drive rotational velocity may increase while the wheel rotational velocity may decrease. When the drive rotational velocity and wheel rotational velocity are within a predetermined range, the locking mechanism may move to the locked state. For example, during movement from an unlocked state to a locked state, a user may apply a transition input force into the drivetrain and the locking mechanism may transmit a portion of the transition input force through the locking mechanism in an intermediate state so the drive rotational velocity may approach the wheel rotational velocity. Once the drive rotational velocity and the wheel rotational velocity are within a predetermined threshold, the locking mechanism may move to the locked state. In other embodiments, a lockout device may prevent movement from the intermediate state to the locked state with the transition input force is greater than 1 pound (4.45 Newtons).

In some embodiments, the locking mechanism, lockout device, safety brake, or combinations thereof may be manually controlled by a user. For example, a locking mechanism may be actuated by a handle. A handle may include a sloped surface that, upon rotation of the handle relative to the locking mechanism may urge the wheel member and the drive member to move relative to one another. In other examples, the handle may have a cam lobe that urges the wheel member and the drive member to move relative to one another.

The locking mechanism may be actuated through automated or powered means other than a manual lever moved by a user. In some embodiments, the handle may be rotated by a motor. In other embodiments, the position of the wheel member and the drive member relative to one another may be controlled by an electric motor, such as a stepper motor or worm gear. In yet other embodiments, the position of the wheel member and the drive member relative to one another by a pneumatic piston-and-cylinder. In further embodiments, the position of the wheel member and the drive member relative to one another by a hydraulic piston-and-cylinder. In yet further embodiments, the position of the wheel member and the drive member relative to one another by a linear magnetic actuator.

A controller may allow the user to selectively actuate the locking mechanism. For example, a controller may be provided on the handlebars and/or frame of a bicycle, a stationary bicycle, elliptical machine, or other pedaled device.

In other embodiments, the locking mechanism, lockout device, safety brake, or combinations thereof may be controlled by a computing device. In some examples, the computing device may coordinate the actuation of one or more of the locking mechanism, lockout device, and safety brake. For example, upon a user requesting the locking mechanism to move from an unlocked state to a locked state, the computing device may activate the safety brake to stop the wheel rotational velocity and/or drive rotational velocity, deactivate the lockout device, and actuate the locking mechanism to move to the locked state.

In other examples, upon a user requesting the locking mechanism to move from an unlocked state to a locked state, the computing device may measure the wheel rotational velocity and/or the drive rotational velocity using one or more sensors (speed sensors, torque sensors, power meters, etc.), and the computing device may actuate the locking mechanism only when the wheel rotational velocity and drive rotational velocity are within a predetermined range.

In other embodiments, the computing device may present to a user a predetermined exercise routine. The predetermined exercise routine may include a portion of the routine pedaling the pedaled drivetrain in an unlocked state and portion of the routine pedaling the pedaled drivetrain in the locked state. In such examples, the computing device may activate the safety brake to slow and/or stop the wheel rotational velocity and/or drive rotational velocity, deactivate the lockout device, and actuate the locking mechanism to move to the locked state, and disengage the safety brake. In other examples, the computing device may move the locking mechanism to an intermediate state to transfer a portion of the torque between the wheel member and drive member. The partial transfer of torque may cause the wheel rotational velocity and drive rotational velocity to approach one another. The computing device may measure the wheel rotational velocity and/or the drive rotational velocity using one or more sensors, and the computing device may actuate the locking mechanism when the wheel rotational velocity and drive rotational velocity are within a predetermined range.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

By way of example, pedaled drivetrains according to the present disclosure may be described according to any of the following sections:

1. A pedaled drivetrain, the drivetrain comprising:
   a drive mechanism;
   a wheel having a rotational axis;
   a freewheel hub connecting the drive mechanism to the wheel and configured to transmit torque from the drive mechanism to the wheel in a first rotational direction around the rotational axis; and
   a locking mechanism having a locked state and an unlocked state, the locked state configured to transmit torque from the drive mechanism to the wheel in at least a second rotational direction around the rotational axis.

2. The drivetrain of section 1, the locking mechanism including a friction clutch.

3. The drivetrain of section 1, the locking mechanism including one or more interlocking mechanical features oriented in an axial direction of the rotational axis.

4. The drivetrain of any of sections 1-3, the locking mechanism including one or more interlocking mechanical features oriented in a radial direction of the rotational axis.

5. The drivetrain of any of sections 1-4, the locking mechanism being stable only in the locked state and the unlocked state.

6. The drivetrain of any of sections 1-5, the locking mechanism including an electric motor to actuate the locking mechanism between the locked state and the unlocked state.

7. The drivetrain of any of sections 1-6, the drive mechanism including a chain.

8. The drivetrain of any of sections 1-7, the wheel being a flywheel.

9. The drivetrain of any of sections 1-8, the locking mechanism having a sloped surface and a pushrod positioned adjacent the sloped surface, the pushrod being stable at a first end of the sloped surface and at a second end of the sloped surface, wherein the pushrod located at the first end is associated with the unlocked state and the pushrod located at the second end is associated with the locked state.

10. The drivetrain of section 9, the pushrod being biased toward the first end.
11. The drivetrain of any of sections 1-10, the locking mechanism having a first portion and a second portion, the locking mechanism being movable between the locked state and the unlocked state by rotating the first portion relative to the second portion.
12. The drivetrain of any of sections 1-11, the locking mechanism having an intermediate state, the intermediate state being configured to transmit between 5% and 95% of a torque between the drive mechanism and the wheel.
13. A cycling system, the system comprising:
    a frame;
    handlebars supported by the frame;
    a drivetrain supported by the frame, the drivetrain including:
        a drive mechanism configured to receive an input torque from a user; and
        the drivetrain of claim 1, wherein the locked state is configured to transmit at least 95% of the input torque to the wheel in the first rotational direction and a second rotational direction of the wheel, the second rotational direction being opposite the first rotational direction.
14. The system of section 13, the locking mechanism actuatable from a controller on the handlebars.
15. The drivetrain of any of sections 1-12 or system of sections 13 or 14, further comprising:
    a computing device in data communication with the locking mechanism, the computing device configured to send a command to an electric motor to move the locking mechanism between the locked state and the unlocked state.
16. The system of section 15, the computing device in data communication with at least one sensor configured to measure rotation of the wheel.
17. The system of sections 15 or 16, the computing device in data communication with a safety brake configured to brake the wheel or drivetrain.
18. The drivetrain of any of sections 1-12 or system of sections 13-17, the locked state being configured to transmit at least 300 Newton-meters of torque.
19. The drivetrain of drivetrain of any of sections 1-12 or system of sections 13-18, further comprising a lockout device configured to prevent movement of the locking mechanism between the locked state and in unlocked state when a wheel member and drive member of the locking mechanism are moving relative to one another.
20. The drivetrain of drivetrain of any of sections 1-12 or system of sections 13-18, further comprising a lockout device configured to prevent movement of the locking mechanism between the locked state and in unlocked state unless a safety brake is engage with the wheel or drivetrain.
21. A method of transmitting torque in a pedaled drivetrain, the method comprising:
    receiving a first input force with at least one pedal;
    converting the first input force to a first input torque in a drivetrain in a first rotational direction of the drivetrain;
    transmitting the first input torque through a freewheel hub to a wheel in a first rotational direction of the wheel;
    moving a locking mechanism from an unlocked state to a locked state to rotationally fix a component of the drivetrain to the wheel;
    receiving a second input force at the at least one pedal;
    converting the second input force to a second input torque in a drivetrain in a second rotational direction of the drivetrain opposite the first rotational direction of the drivetrain; and
    transmitting the second input torque through the locking mechanism to the wheel in the second rotational direction of the wheel.
22. The method of section 21, further comprising:
    moving the locking mechanism to an intermediate state;
    transmitting between 5% and 95% of a third input torque from the drivetrain to the wheel in the intermediate state; and
    after a drivetrain rotational velocity is within 5% of a wheel rotational velocity, moving the locking mechanism to the locked state.
23. The method of section 21 or 22, moving a locking mechanism from an unlocked state to a locked state including actuating an electric motor.
24. The method of any of sections 21-23, moving a locking mechanism from an unlocked state to a locked state including moving at least one component of the locking mechanism in an axial direction of the rotational axis of the wheel.
25. The method of any of sections 21-24, moving a locking mechanism from an unlocked state to a locked state including moving at least one component of the locking mechanism in an axial direction of the rotational axis of the wheel.
26. The method of any of sections 21-25, further comprising moving a wheel member of the locking mechanism relative to the wheel, the wheel member rotationally fixed relative to the wheel.
27. The method of any of sections 21-26, further comprising moving a drive member of the locking mechanism in an axial direction relative to the rotational axis of the wheel, the drive member rotationally fixed relative to a component of the drivetrain.
28. The method of any of sections 21-27, further comprising moving a drive member of the locking mechanism in a radial direction relative to the rotational axis of the wheel, the drive member rotationally fixed relative to a component of the drivetrain.
29. The method of any of sections 21-28, moving a locking mechanism from an unlocked state to a locked state including frictionally engaging a wheel member and a drive member of the locking mechanism, the wheel member being rotationally fixed relative to the wheel and the drive member being rotationally fixed relative to a component of the drivetrain.
30. The method of any of sections 21-29, moving a locking mechanism from an unlocked state to a locked state including fluidly engaging a wheel member and a drive member of the locking mechanism, the wheel member being rotationally fixed relative to the wheel and the drive member being rotationally fixed relative to a component of the drivetrain.
31. The method of any of sections 21-30, further comprising sending a command from a computing device to the locking mechanism to move the locking mechanism from the unlocked state to a locked state.
32. The method of any of sections 21-31, sending a command from a computing device including coordinating moving the locking mechanism with an exercise routine presented to a user.

33. The method of any of sections 21-32, further comprising displaying an exercise routine to a user on a display.
34. The method of any of sections 21-33, further comprising engaging a lockout device that prevents moving the locking mechanism from the unlocked state to the locked state when the wheel is rotating.
35. The method of any of sections 21-34, further comprising engaging a lockout device that prevents moving the locking mechanism from the unlocked state to the locked state when a wheel member of the locking mechanism is rotating relative to a drive member of the locking mechanism at a rate greater than a predetermined threshold value, the wheel member being rotationally fixed relative to the wheel and the drive member being rotationally fixed relative to a component of the drivetrain.
36. The method of any of sections 21-35, further comprising engaging a brake to stop rotation of the wheel before moving the locking mechanism from the unlocked state to the locked state.
37. The method of any of sections 21-36, further comprising engaging a lockout device that only allows moving the locking mechanism from the unlocked state to the locked state when the brake is engaged.
38. The method of any of sections 21-37, further comprising:
   measuring a wheel rotational velocity of the wheel around the rotational axis and a drive rotational velocity of the drivetrain around the rotational axis; and
   engaging a lockout device that prevents moving the locking mechanism from the unlocked state to the locked state when the wheel rotational velocity is more than 10% different from the drive rotational velocity.
39. The method of section 38, further comprising:
   measuring a transition input force from a user at a pedal of the drivetrain; and
   engaging a lockout device that prevents moving the locking mechanism from the unlocked state to the locked state when the transition input force is greater than 1 pound (4.45 Newtons).
40. The method of section 39, further comprising:
   after transmitting the second input torque through the locking mechanism in the second rotational direction, moving a locking mechanism from the locked state to unlocked locked state to rotationally decouple the component of the drivetrain from the wheel.

What is claimed is:
1. A pedaled drivetrain on a stationary exercise device, the drivetrain comprising:
   a drive mechanism;
   a flywheel having a rotational axis;
   a freewheel hub connecting the drive mechanism to the flywheel and configured to transmit torque from the drive mechanism to the flywheel in a first rotational direction around the rotational axis; and
   a locking mechanism having a locked state and an unlocked state, the locked state configured to transmit torque from the drive mechanism to the flywheel in at least a second rotational direction around the rotational axis, wherein at least a portion of the locking mechanism extends through the flywheel.
2. The drivetrain of claim 1, the locking mechanism including a friction clutch.
3. The drivetrain of claim 1, the locking mechanism including one or more interlocking mechanical features oriented in an axial direction of the rotational axis.
4. The drivetrain of claim 1, the locking mechanism including one or more interlocking mechanical features oriented in a radial direction of the rotational axis.
5. The drivetrain of claim 1, the locking mechanism being stable only in the locked state and the unlocked state.
6. The drivetrain of claim 1, the locking mechanism including an electric motor to actuate the locking mechanism between the locked state and the unlocked state.
7. The drivetrain of claim 1, the drive mechanism including a chain.
8. The drivetrain of claim 1, further comprising a lockout device configured to prevent movement of the locking mechanism between the locked state and in unlocked state when a wheel member and drive member of the locking mechanism are moving relative to one another.
9. The drivetrain of claim 1, further comprising a lockout device configured to prevent movement of the locking mechanism between the locked state and in unlocked state unless a safety brake is engage with the flywheel or drivetrain.
10. The drivetrain of claim 1, the locking mechanism having a sloped surface and a pushrod positioned adjacent the sloped surface, the pushrod being stable at a first end of the sloped surface and at a second end of the sloped surface, wherein the pushrod located at the first end is associated with the unlocked state and the pushrod located at the second end is associated with the locked state.
11. The drivetrain of claim 10, the pushrod being biased toward the first end.
12. The drivetrain of claim 1, the locking mechanism having a first portion and a second portion, the locking mechanism being movable between the locked state and the unlocked state by rotating the first portion relative to the second portion.
13. The drivetrain of claim 1, the locking mechanism having an intermediate state, the intermediate state being configured to transmit between 5% and 95% of a torque between the drive mechanism and the flywheel.
14. A stationary cycling system, the system comprising:
   a frame;
   handlebars supported by the frame;
   a drivetrain supported by the frame, the drivetrain including:
      a drive mechanism configured to receive an input torque from a user;
      a flywheel;
      a freewheel hub connecting the drive mechanism to the flywheel and configured to transmit the input torque from the drive mechanism to the flywheel in a first rotational direction of the flywheel only; and
      a locking mechanism connected to the drive mechanism and the flywheel, the locking mechanism having a locked state and an unlocked state, the locked state configured to transmit at least 95% of the input torque to the flywheel in the first rotational direction and a second rotational direction of the flywheel, the second rotational direction being opposite the first rotational direction, wherein at least a portion of the locking mechanism extends through the flywheel.
15. The system of claim 14, the locking mechanism actuatable from a controller on the handlebars.
16. The system of claim 14, further comprising:
   a computing device in data communication with the locking mechanism, the computing device configured to send a command to an electric motor to move the locking mechanism between the locked state and the unlocked state.

17. The system of claim 16, the computing device in data communication with at least one sensor configured to measure rotation of the flywheel.

18. The system of claim 16, the computing device in data communication with a safety brake configured to brake the flywheel or drivetrain.

19. The system of claim 14, the locked state being configured to transmit at least 300 Newton-meters of torque.

* * * * *